(12) United States Patent
Farrell et al.

US008112347B2

(10) Patent No.: US 8,112,347 B2
(45) Date of Patent: Feb. 7, 2012

(54) CONTROLLING IMPLIED MARKETS DURING A STOP LOSS TRIGGER

(75) Inventors: James Farrell, Wheaton, IL (US); James Krause, Palatine, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 951 days.

(21) Appl. No.: 11/900,756

(22) Filed: Sep. 13, 2007

(65) Prior Publication Data

US 2008/0010187 A1   Jan. 10, 2008

Related U.S. Application Data

(63) Continuation-in-part of application No. 10/713,126, filed on Nov. 14, 2003.

(60) Provisional application No. 60/490,145, filed on Jul. 25, 2003.

(51) Int. Cl.
*G06Q 40/00* (2006.01)

(52) U.S. Cl. .......................................................... 705/37

(58) Field of Classification Search .............. 705/35–38
See application file for complete search history.

(56) References Cited

U.S. PATENT DOCUMENTS

| | | | |
|---|---|---|---|
| 4,903,201 A | 2/1990 | Wagner | |
| 4,980,826 A | 12/1990 | Wagner | |
| 6,418,419 B1 | 7/2002 | Nieboer et al. | |
| 7,099,839 B2 * | 8/2006 | Madoff et al. | 705/37 |
| 2001/0049651 A1 | 12/2001 | Selleck | |
| 2002/0156718 A1 | 10/2002 | Olsen et al. | |
| 2003/0069830 A1 * | 4/2003 | Morano et al. | 705/37 |
| 2005/0075965 A1 | 4/2005 | Cutler | |
| 2005/0075966 A1 | 4/2005 | Duka | |
| 2005/0108141 A1 | 5/2005 | Farrell et al. | |
| 2005/0283423 A1 * | 12/2005 | Moser et al. | 705/37 |
| 2006/0167779 A1 | 7/2006 | Turner | |
| 2008/0015970 A1 * | 1/2008 | Brookfield et al. | 705/37 |

OTHER PUBLICATIONS

"Code of Federal Regulations," Commodity and Securities Exchanges, Apr. 1, 1983, Parts 1-239, pp. 1-322.
Teweles and Bradley, "The Stock Market," Fourth Edition, 1982, John Wiley & Sons, Inc., pp. 136-179.
Melamed, Leo, "Automation in the Futures Industry" Proceedings of a Conference Sponsored by Commodity Futures Trading Commission, Jun. 15, 1977, Washington, D.C., pp. 1-2 and 273-283.
Aitken and Berry, "Surveillance Literature . . . Market Surveillance at the Australian Stock Exchange: An Overview", 5th Draft, Jul. 1991, pp. 1-21.

(Continued)

*Primary Examiner* — Jessica Lemieux
(74) *Attorney, Agent, or Firm* — Lempia Summerfield Katz LLC

(57) ABSTRACT

A system mitigates the effects of a market spike caused by the triggering and the election of a conditional order in an automated matching system. Conditional orders submitted to a trading engine are evaluated to compare a price of an order to a predetermined price range. Matching of the orders may be delayed when the price of the orders lies outside of the predetermined price range. An opening price to be used by the trading engine is derived and a time interval is used to delay a matching of the orders until the opening price is within a predetermined price range up to a maximum delay time set by a control center. Implied spreads are also removed until other instruments within a trading unit are verified open.

19 Claims, 5 Drawing Sheets

OTHER PUBLICATIONS

Barish and Siff, "Operational Gaming Simulation With Application to a Stock Market," Management Science, Journal of the Institute of Management Sciences, vol. 15, No. 10, Jun. 1969, pp. B-530-B-541.

Garman, Mark B., "A Description of an Experimental Securities Exchange" University of California, Berkeley, Mar. 1975, revised Oct. 1975, pp. 1-17 and Appendix pp. 1-3.

"Automated Bonds System (ABS), User Manual", The New York Stock Exchange, Floor Operations Department, Feb. 27, 1976, 75 pages.

French and Roll, "Journal of Financial Economics the Arrival of Information and Reaction of Traders", Stock Return Variances Elsevier Science Publishers B.V. (North Holland), 1986, pp. 5-27.

Blume, Siegel and Rottenberg, Revolution on Wall Street, The Rise and Decline of the New York Stock Exchange, "Chapter 11: Technology and the Marketplace", W.W. Norton & Company, New York and London, 1993, pp. 192-214.

Letter to George A. Fitzsimmons, Securities and Exchange Commission, Apr. 30, 1976, pp. 1-4.

Williams, Arlington W. "Computerized Double-Auction Markets: Some Initial Experimental Results," The Journal of Business, The Graduate School of Business of the University of Chicago, vol. No. 3, Part 1, Jul. 1980, pp. 235-258.

Carrington, "Computer Linkups Letting Traders Start Up Securities Firms at Home," The Wall Street Journal, Wednesday, Dec. 9, 1981, p. 33.

Bleiberg, Robert M., "Market Winner, Financial Futures Have Scored Remarkable Gains," Barron's National Business and Financial Weekly, Dow Jones & Company, Inc., Nov. 30, 1981, p. 7.

Ettorre, Barbara, "Faces Behind the Figures", Forbes, Aug. 30, 1982, p. 139.

Wall Street Letter, Aug. 30, 1982, p. 7.

Wall Street Letter, Aug. 2, 1982, p. 3.

Dunne, Nancy, "Dawn of Electronic Age for Futures", London Financial Times, Wednesday, Dec. 23, 1981, p. 1.

"INTEX Update for Members", Nov. 1982, p. 1.

Witcher, S. Karene, "New Exchange Plans Commodity Trading Through Computers: Intex Won't Have Noisy Floor When It Offers Contracts on Gold and Bonds", Update: The Wall Street Journal, Thursday, Aug. 5, 1982, p. 1.

Gampetro, Tony, "Intex Unveils Trade Contracts", Journal of Commerce, Thursday, Aug. 5, 1982, p. 1.

"Testimony of K. Richard B. Niehoff, President of Cincinnati Stock Exchange", Washington, D.C., Sep. 24, 1979, pp. 1-10.

Peake, Mendelson, and Williams, "The National Book System, An Electrically Assisted Auction Market", (Together with letter of transmittal to the Securities and Exchange Commission, in response to Release No. 12159/Mar. 2, 1976), Apr. 30, 1976, 105 pages.

"A Feasibility Study for the Toronto Stock Exchange", Jun. 12, 1970, pp. 1-165 and Appendix 1-14.

"Good-bye to the pits?, Intex may not put the commodity pits out of business, but lots of members have signed up—just in case it catches on", Financial World, Feb. 28, 1983, pp. 35-37.

Morris, John, "Contracts are Listed for Bermuda's Exchange", American Banker, Oct. 20, 1981, 4 pages.

"INTEX, This new Exchange is the fastest and most accurate futures trading system anywhere—and it's world-wide. That's Intex. Yes, That's Intex", Bermuda, Jun. 17, 1982, p. 1.

"INTEX Update for Members", Sep. 15, 1982, pp. 1-2.

"The U.S. National Market System: Progress, Problems, and Issues", Remarks by William M. Batten, Nov. 13, 1980, pp. 1-23.

"News Release, The New York Stock Exchange, NYSE Chairman Cites Progress On National Market System", Sep. 24, 1979, pp. 1-6.

"Remarks by William Batten, Chairman, New York Stock Exchange, Inc. Before the Committee on Oversight and Investigations and the Subcommittee on Consumer Protection and Finance of the committee on Interstate and Foreign Commerce of the House of Representatives", Sep. 24, 1979, pp. 1-6.

"An Assessment of Progress Toward the Development of a National Market System", Sep. 24, 1979, pp. 1-20.

"House Scrutinizing Pace of National Market System Formulation," Securities Industry Association, Washington Report, Oct. 1, 1979, p. 1.

Melton, William C., "Corporate Equities and the National Market System," Federal Reserve Bank of New York, vol. 3, No. 4, 1978-79, pp. 13-25.

"Memo to All NASD Members, regarding Commencement of Trade Reporting in National Market System Tier 1 Securities", Feb. 12, 1982, 10 pages.

"First Annual National Market System Conference", Plaza Hotel New York, Jun. 15-17, 1978, pp. 1-90.

Fuller and Simon, "The National Market System in Perspective: A Selective Outline of Significant Events", May 15, 1978, 56 pages.

Melton, William C., "Corporate Equities and the National Market System", FRBNY Quarterly Review/Winter 1978-79, pp. 13-25.

"The Battle for a National Market System in Perspective", Dec. 1, 1977, pp. 1-22.

Williams, Harold M., "The National Market System in Perspective", Dec. 1, 1977, pp. 1-22.

"Instructions for Trade Reporting and Entry of Size in the Nasdaq/National Market System", Feb. 1982, 18 pages.

"A Report of Progress on National Market System and Related Developments at the New York Stock Exchange", Nov. 20, 1978, 16 pages.

Memo to NASDAQ Level II and Level III Subscribers from John H. Hodges, Jr., regarding Commencement of Trade Reporting in NASDAQ national Market System Tier 1 Securities dated Feb. 10, 1982, 2 pages.

Williams, Harold M., "The Securities Industry and the National market System: A Current Perspective", News, Securities and Exchange Commission, Nov. 29, 1979, 31 pages.

Securities Week, Mar. 19, 1979, 2 pages.

Williams, Harold M., "The Securities Industry Entering the Eighties: An Economic Overview," news, Securities and Exchange Commission, Nov. 29, 1979, 31 pages.

Williams, Harold M., "The National Market System: An Update", News, Securities and Exchange Commission, Oct. 5, 1980, 45 pages.

"Why the Big Players Want a Piece of Instinet", Money & Markets *Fortune*, Aug. 19, 1985, p. 1.

Sporleder, Thomas L. and Davis, Ernest E., "Cattlex, A Computerized Cash and Contract Market for Feeder and Stocker Cattle, Operating Procedures and Trading Techniques", Technical Report No. 813, Apr. 1981, 40 pages.

Lorie, James H., "Conjectures on the Securities Industry in 1982", Chapter II, pp. 29-39.

Merrill, Lynch, Pierce, Fenner & Smith Incorporated, "Proposal for a National Market System" Oct. 16, 1975, pp. 1-28.

Peake, Junius W., "Computers, Competition and Monopoly", Mar. 25-26, 1977, 10 pages.

"SEC Clears Cincinnati Exchange to Offer First All-Electronic Stock Trading in U.S.", The Wall Street Journal, Tuesday, Apr. 11, 1978, p. 1.

Peake, Junius W., "The Regulatory Role in Systems Development", Mar. 25-26, 1977, p. 1-9.

Peake, Junius W., "Order Flow, Market Making and the National Market System", Mar. 15, 1978, p. 1-7.

Peake, Junius W., "The Trader and Automated Execution: Where Is It Leading, and Why?", 1983, p. 1-6.

Rees, John, "An Exclusive Interview with the Governor of the Pacific Stock Exchange", the Review of the News, Dec. 19, 1979, pp. 31-46.

Peake, Junius W., "Treasury Marketable Securities Systems", Jun. 14, 1983, pp. 1-29.

Peake, Junius W., "The Investor, the Institution and the National Market System", Jan. 25, 1978, pp. 1-11.

NASD Recommendations to the SEC on Qualifications for Securities in the National Market System, to Honorable Harold M. Williams from Gordon S. Macklin, Jun. 7, 1978, pp. 8-12.

Peake, Junius W., "The "Crowd", and the National Market System", Jun. 14, 1978, 21 pages.

"International Commodities Clearing House Limited, General Regulations for Future Delivery Business and Byelaws for Options", Sep. 6, 1982, 4 pages.

Fuller, James W., et al., "Outlook for the U.S. Securities Industry 1981", vol. II, Final Report, Jun. 1977, Chapters 1-11, 414 pages.
Zyncon Corporation, "Communications Study for World Energy Exchange", Jul. 26, 1983, 21 pages.
Letter to Mr. Andrew M. Klein of the Securities and Exchange Commission from Weeden & Co., Donald E. Weeden, Oct. 20, 1978, 10 pages.
Hutchinson, A.M., "Candat Displays for Cats Terminals", Dec. 5, 1974, 6 pages.
"National Securities Trading System Review for Securities and Exchange Commission", Apr. 15, 1982, pp. 1-21.
Cleland, H., "Draft Appendix D: Outline of Method and Criteria for Evaluation of Cats as a Mechanism to Replace the TSE Trading Floor-Possible Schedule for Implementation", Jun. 3, 1976, Part I and Part II, 10 pages.
McAvoy, B.J., "Cats Pilot, General Outline for Testing CATS", Feb. 24, 1976, 3 pages.
McAvoy, B.J., "Status of Cats", May 31, 1976, 2 pages.
"Cats project Applications Today: Trader Training, Simulated Trading, Live: Stock Trading, Evaluation: Plan and Timing" the Toronto Stock Exchange, Mar. 2, 1976, 4 pages.
Letter to Mr. George A. Fitzsimmons, Secretary, Securities and Exchange Commission, from K. Richard B. Niehoff, Jul. 24, 1979, 6 pages.
Letter to Martin L. Budd, Security and Exchange Commission, from Peake, Mendelson and Williams, Nov. 4, 1976, 5 pages.
Adron, J.M., "Current Status on CATS", Apr. 1, 1977, pp. 1-3.
Adron, M., "CATS Status Overview", Mar. 17, 1977, pp. 1-5.
Maron, J., "CATS Activities", Dec. 2, 1977, pp. 1-5.
Letter to Harold M. Williams of Securities and Exchange Commission, from MSE Richard B. Walbert, regarding File Nos. S7-735 and S7-759, Nov. 24, 1978, pp. 1-66.
Maron, J., "CATS—Special Terms Market", Oct. 26, 1976, pp. 1-2.
McAvoy, B.J., "Proposal for Training CATS Users", Feb. 23, 1976, pp. 1-9.
Letter to Mr. Junius W. Peake from Dan W. Schneider, United States Department of Justice, Mar. 22, 1979, 4 pages.
Letter to Mr. George A. Fitzsimmons of Securities and Exchange Commission, from Securities Industry Association, regarding Development of Order Routing and Market Linage Systems, Aug. 4, 1978, pp. 1-20.
Ardon, et al., "A Planning Report for the Toronto Stock Exchange", Jun. 1969, 44 pages.
"Report to Members-TSE Project to Investigate Computer Assisted Trading", The Toronto Stock Exchange Notice to Members No. 1827, Feb. 14, 1979, 11 pages.
Report to Mr. K. Richard B. Niehoff from Deloitte Haskins and Sells, Nov. 14, 1978, pp. 1-32.
Letter to John S. R. Shad of Securities and Exchange commission, from the Cincinnati Stock Exchange, Dec. 31, 1981, pp. 1-3.
"Cats Service and Information Centre," The Toronto Stock Exchange, CATS Project Notice 79-3, Mar. 15, 1979, 175 pages.
Williams, Harold M., "Progress Toward the Development of a National Market System", 1979, 549 pages.
Memo to Mr. J.R. Kimber and Mr. W.L. Somerville, from Mr. M. Ardron, regarding Planning Study for Computer-Assisted Trading (1), Aug. 26, 1969, 4 pages.
Wall Street Letter, Nov. 7, 1983, 1 page.
Update, INTEX Press Information, Sep. 29, 1982, 3 pages.
Brown, Sidney, "Electronic Commodities market to Operate Offshore", DOLLAR, The International Journal of American Investments, May 1982, 1 page.

O'Toole, Edward T., "Surge in Financial Futures Is Only the Beginning," DOLLAR, The International Journal of American Investments, May 1982, 4 pages.
"Want to Play the Market? Try Index Futures", DOLLAR, The International Journal of American Investments, May 1982, 1 page.
"A Glossary of Financial Futures Terms", DOLLAR, The International Journal of American Investments, May 1982, 1 page.
Mendelson, Morris, "From Buttonwood to Satellite Via Wall Street", Dec. 1977, pp. 1-33.
Commodity Futures Law Reporters, Futures Trading Act of 1982, No. 175, Jun. 7, 1982, 248 pages.
Letter to Mr. Martin L. Budd of National Market Advisory Board, from Peake, Mendelson and Williams, Aug. 20, 1976, pp. 1-6.
"Automated Bond System", The New York Stock Exchange, Automated Bond System, Securities Week, Oct. 1, 1978, 4 pages.
NYSE-IBM Study Years Ago Urged Development of Electronic Trading Arena, Security Week, Nov. 22, 1976, pp. 3-4.
Securities Pacific Links with Intex to Automatic Money Markets, Securities Week, Aug. 2, 1982, 1 page.
"Automated Trading Concept", The Banker, Apr. 1982, 1 page.
"Regulations, The International Futures Exchange (Bermuda) Ltd.", Jan. 15, 1983, 87 pages.
Batten, William M., "The ABC's of the ABS", Nov. 22, 1977, pp. 1-15.
Appleby, Spurling & Kempe, "Bye-Laws of the International Futures Exchange (Bermuda) Limited", Jul. 8, 1981, 54 pages.
Morris, John, "Bermuda Says Yes to Futures Trading", American Banker, Wednesday, Jul. 8, 1981, 1 page.
"Statement of the American Stock Exchange, Inc. Before the Joint Hearings of the House Subcommittee on Oversight and Investigation and the House Subcommittee on Consumer Protection and Finance on the Development of a National Market System", Sep. 24, 1979, 13 pages.
"The Emerging National Market System", Feb. 7, 1977, 2 pages.
"Interest rate products: Eurodollar bundles", *Chicago Mercantile Exchange*, http: //www.cme.com/products/interest_rate/products_interstrate_ed_bundels.cfm, printed on Feb. 9, 2003, pp. 1-3.
Excerpt from CME's 2002 Rulebook, Chapter 5 Floor Privileges—Trading Qualifications and Practices, printed Jan. 2, 2003, pp. 10-21.
Gampetro, Tony, INTEX Gearing up for Autumn Opening, Financial Futures Focus, Commodities, p. 7A.
Office Action dated Aug. 8, 2010 in related Japanese Patent Application No. 20026-521123 (3 pages).
Yutaka Fukushima: "Method of Matching Orders and Price Volatility in JGB Futures Market—Analysis of Strategic Order, Appropriate Trade Rule in Accordance with Market Condition" 2001 the $9^{th}$ Conference of Nippon Finance Association Draft Report, Jun. 3, 2001, pp. 303 to 316 (with translation).
Naoto Isaka: "Mechanism for Recovery of Liquidity After Large-Scale Macro Shock—Tokyo Stock Exchange just after 9/11" 2003 fiscal year the $11^{th}$ Conference of Nippon Finance Association Draft Report, Jun. 7, 2003, pp. 317 to 331 (with translation).
Notification of Reasons for Rejection, Japanese Patent Office, Application No. 2006-521123, Nov. 10, 2009, 4 pages.
International Search Report in related Application No. PCT/US2008/075974 dated Nov. 21, 2008.
Written Opinion of the International Searching Authority in related Application No. PCT/US2008/075974 dated Mar. 25, 2010.
International Search Report in related Application No. PCT/US2008/075980 dated Nov. 21, 2008.
Written Opinion of the International Searching Authority in related Application No. PCT/US2008/075980 dated Mar. 25, 2010.

* cited by examiner

CONTROLLING IMPLIED MARKETS DURING A STOP LOSS TRIGGER

PRIORITY CLAIM

This application is a continuation-in-part of U.S. patent application Ser. No. 10/713,126, filed Nov. 14, 2003, which claims the benefit of U.S. provisional patent application Ser. No. 60/490,145, filed Jul. 25, 2003. The entire content of these applications are incorporated by reference in their entirety except that in the event of any inconsistent disclosure from the present disclosure, the disclosure herein shall be deemed to prevail.

BACKGROUND OF THE INVENTION

1. Technical Field

This invention relates to monitoring financial transactions, and particularly, to mediating an unbalanced market.

2. Related Art

The speed in which trades are executed through electronic trading systems provide many benefits. Electronic trading systems can facilitate a large number of market transactions. The greater the number of market transactions, the greater a market's liquidity. In liquid markets, prices are driven by competition; prices reflect a consensus of an investment's value; and trading systems provide a free and open dissemination of information.

While speed and efficiency in electronic markets can enhance trader wealth, these qualities can also increase the adverse affect of a trade that triggers an election of buy or sell stop orders. In a futures market that has few resting orders but many stop orders, an order executed at a limit price can cause a cascading execution of buy or sell stop orders. The triggering and election of these stop orders can seem almost instantaneous, lowering the value of a market in just a few seconds.

A problem may occur when one or more trades bring many stop orders into the market. A fast execution of these stop orders may prevent opposite side orders from entering the market, preventing buyers from competing against other buyers and sellers from competing against other sellers. An onset of stop orders may enter the market in the following sequence:

1. A stop order, triggered by a trade, enters the market at a limit price.
2. The limit price trades almost immediately.
3. A second stop order to buy, triggered by the last trade, enters the market at a higher limit price (or a lower limit price if the order is a stop order to sell).
4. This new limit price trades almost immediately.
5. A third stop order to buy, triggered by the last trade, enters the market at a higher limit price (or a lower limit price if the order is a stop order to sell) and so forth.

The order processing sequence occurs quickly; so quickly that traders may not be able to prevent the buy or sell stop orders from trading away from the current market prices by entering opposite side orders.

The entire process may be illustrated through a hypothetical E-Mini S&P 500 futures market ("ESM3"). In Table 1, an order entered on the bid side of the market for a quantity of 1 at a price of 873.75, trades. As the order trades, multiple stop orders enter the market, which in turn trade and bringing other stop orders into the market. In the ESM3 market,

TABLE 1

| | | | ESM3 | | | |
|---|---|---|---|---|---|---|
| TON | | QTY | BID | ASK | QTY | TON |
| TON 6 | Stop (88075) | 5 | 88475 | 87375 | 10 | TON 1 |
| TON 7 | Stop (87875) | 5 | 88475 | 87475 | 5 | TON 2 |
| TON 8 | Stop (87825) | 5 | 88325 | 87675 | 5 | TON 3 |
| TON 9 | Stop (87675) | 5 | 88475 | 87900 | 1 | TON 4 |
| TON 10 | Stop (87525) | 5 | 88475 | 88075 | 1 | TON 5 |
| TON 11 | Stop (87375) | 10 | 87900 | | | |
| TON 12 | Stop (87375) | 10 | 87675 | | | |
| Incoming | | 1 | 87375 | | | |

Trade 1 Incoming (1-lot) trades with Trade Order Number (TON) 1 (1-lot) at 873.75;
TON 12-Stop (87375), TON 11-Stop (87375) are triggered by Trade 1;
Trade 2 TON 12 (9-lot) trades with TON 1 (9-lot) at 873.75;
Trade 3 TON 12 (1-lot) trades with TON 2 (1-lot) at 874.75;
Trade 4 TON 11 (4-lot) trades with TON 2 (4-lot) at 874.75;
Trade 5 TON 11 (5-lot) trades with TON 3 (5-lot) at 876.75;
TON 10-Stop (87525), TON 9-Stop (87675) are triggered by Trade 5;
Trade 6 TON 11 (1-lot) trades with TON 4 (1-lot) at 879.00;
TON 8-Stop (87825) and TON 7-Stop (87875) are triggered by Trade 6.
Trade 7 TON 10 (1-lot) trades with TON 5 (1-lot) at 880.75; and
TON 6-Stop (88075) is triggered by Trade 7.
After the cascading triggers of stop orders trade, the final resting price of the market drops to 884.75.

TABLE 2

| | ESM3 | | |
|---|---|---|---|
| QTY | BID | ASK | QTY |
| 19 | 88475 | | |
| 5 | 88325 | | |

To mitigate the harmful effects of a cascading trigger of stop orders, some exchanges have adopted policies and procedures that, in the appropriate case, permit the cancellation or busting of selected trades. However, the cancellation or busting of trades does not occur simultaneously and is not in the best interest of market participants. An exchange must first identify the problem and then decide on a solution.

In the hypothetical E-Mini S&P 500 futures market, first the exchange must determine what caused the market movement. Once that problem is discovered, the exchange would then have to decide if the market movement lies outside of a "no-bust range." In a "no-bust range," trades executed within a price range may not be subject to cancellation, even if executed in error. Trades executed at prices outside of the exchange's "no-bust range" are considered as quite possibly being beyond normal market forces. Considering the high interdependence of many markets, disruptions may occur in other related markets such as the Nasdaq-100 Index or a larger S&P 500 futures contract that are highly correlated to the hypothetical E-Mini S&P 500.

While such decisions are considered, traders are exposed to serious market risk until a decision is made and until they are notified of the decision. Furthermore, traders will not know if their gains or loses will be reversed. Traders that were short before the cascade of stop order triggers occurred and bought at the bottom of the market may not realize expected gains. Similarly, traders that went long after the market dip could lose their expected gains. Because gains and loses may disappear the instant an exchange announces that trades will be busted, some traders will not spend unrealized money on new trades. Other traders may be forced out of the market until the decision to bust trades is reached to avoid an unexpected margin call.

Another problem may occur when a stop loss trigger occurs in more than one market with a same or overlapping time period. In particular, products may be linked with each other such that movement in the market for one product may affect movement in the market for one or more other products. In addition, a product may form one or more legs of an implied spread market. An implied spread is a difference between two prices, such as a difference between futures prices for two related products. Implied spreads may add additional contracts to the market where there would otherwise have been less activity for products. Whereas an outright order is a real order for a product, an implied spread order may be generated by the electronic trading system based on the combination of outright orders or spreads that are pending in the electronic trading system. A spread may provide a market where a strategy trade can be made by leveraging liquidity in component markets. The electronic trading system may identify an implied spread order by combining outright orders for related products. Examples of implied spreads include Implied In, Implied Out, Calendar Spreads, Butterfly Spreads, Crack Spreads and other strategy types.

Because the implied spread market pricing is determined by pricing of the products that make up legs of implied spread orders, a stop loss trigger in one product of an implied spread could adversely affect the implied spread market. In addition, since the markets for products are often linked, a stop loss trigger may occur for more than one product in the same time period. When this occurs, the implied spread market based on these products may be adversely affected.

The present invention is directed to a system and method that overcome some of these potential drawbacks in the prior art.

SUMMARY

The present invention is defined by the following claims. This description summarizes some aspects of the present embodiments and should not be used to limit the claims.

A system mitigates a spike caused by a triggering of conditional orders for products within a trading unit in an automated matching system. The system includes evaluation logic, delay logic, pricing logic, timing logic, and verification logic. The evaluation logic monitors orders submitted to an automated trading engine. The evaluation logic compares an execution price of a conditional order to a predetermined price range. The delay logic delays matching orders submitted to the automated trading engine when the execution price of the order lies outside of the predetermined price range. The pricing logic derives an opening price to be used by the automated trading engine. The timing logic measures a time interval used to delay a matching of the orders until the opening price is within a second predetermined price range or an interval of time lapses. The verification logic delays restarting a matching of implied orders until the products within the trading unit are verified as not in a stop loss condition.

A method of mitigating a spike caused by a triggering of conditional orders for products within a trading unit includes monitoring orders submitted to the automated trading engine. The method compares an execution price of a conditional order to a predetermined price range and delays the matching of orders submitted to the automated trading engine when an execution price of the order lies outside of the predetermined price range. The method derives an opening price to be used by the automated trading engine; and measures the time interval that delays the matching of the orders until the opening price is within a second predetermined price range or a time interval lapses. The method verifies that products within the trading unit are not in a stop loss condition and delays the matching of the implied orders until the other products within the trading unit are not in a stop loss condition. The method may be repeated to ensure that the opening price reflects a current market movement.

An alternative or additional embodiment includes a matching engine. When a matched order changes a last traded price level, a matching engine checks a stop order book to determine if any new stop orders can be introduced into the market. When a difference between an original price and a currently traded price caused by a stop order execution reaches a predetermined threshold, the matching engine sends a command to reserve, or temporarily suspend matching, for a predetermined period of time, thus allowing opposite side orders to enter the system in response to this event.

While trading is suspended, an indicative opening price (IOP) is calculated and stop orders, resting orders, and newly arriving orders resolve into a single price opening. In this embodiment, the single price opening may use pre-opening and circuit breaker logic used in exchanges. The nature of this opening is such that stop orders, once synthetically introduced during a reserved or pre-opening state, are filled in a limit price priority sequence instead of in the trigger price sequence used in some continuous trading systems. The implied spreads having at least one common leg with the reserved market are disabled until all markets within the associated trading unit are confirmed open, or not held in reserve. This effectively breaks a stop order ladder for all the reserved products within a trading unit, as well as all implied spreads based off those products. Each individual market in the trading unit that is not reserved may still trade outright orders in a non-implied fashion during the window when the implied spreads are disabled.

An alternative or additional method checks the value of a single price opening and compares the price to the last traded price to verify that the price is within the previously specified threshold. If it is not within the threshold, another timing window will lapse and the method check is repeated at a second predetermined threshold, such as twice a predetermined threshold, etc. After a predetermined or programmed number of iterations of timing windows lapses or a manual intervention occurs, the product opens and the matching engine matches orders regardless of a price movement. Any implied spreads based on the product are disabled until all products within the associated trading unit are confirmed open, or not held in reserve.

Further aspects and advantages of the invention are described below in conjunction with the present embodiments.

BRIEF DESCRIPTION OF THE DRAWINGS

The system may be better understood with reference to the following drawings and description. The components in the figures are not necessarily to scale, emphasis instead being

DETAILED DESCRIPTION OF THE PREFERRED EMBODIMENTS

The system mitigates or prevents market spikes due to the triggering, election and trading of conditional orders. The system includes an automated trading engine that performs a verification of a tradable conditional order that is triggered, to ensure that a traded price will not violate a predetermined trade threshold or existing exchange matching rules. If a potential trade price lies outside of the trade threshold, the instrument is placed in a reserved state allowing orders to be entered, modified, and/or cancelled. Implied spreads that are resting on the order book based off or having a common leg with the instrument held in reserve are disabled so only non-implied outright orders can match on the remaining unreserved instruments in the trading unit.

While an instrument may not trade when it is reserved, an indicative opening price of that instrument may be derived and disseminated to the market. The indicative opening price may reflect the price the instrument would be trading at if the market were open. Placing an instrument in a reserved state allows additional orders to be entered into the market from market participants. The additional orders may adjust the indicative opening price to a level that reflects buyers competing with other buyers and sellers vying against other sellers. The present embodiments may suspend trading until the market is adjusted within a threshold range, and/or when a period of time lapses. The period of time may vary in length in relation to the time of day, the product traded, market volatility and/or any other relevant market condition or combination of market conditions. Similarly, the threshold range may vary by the product and/or the time of day.

Before the implied spreading is re-enabled, the system may examine other instruments within the associated trading unit to verify that the other instruments are not in reserve. If the other instruments in the trading unit are in reserve, the system may delay matching the implied spread orders until the other instruments are not in reserve. When the system verifies that the other instruments are not in reserve, the implied spread prices are repopulated, an implied opening takes place, and full implied trading is re-enabled.

Figure 1:
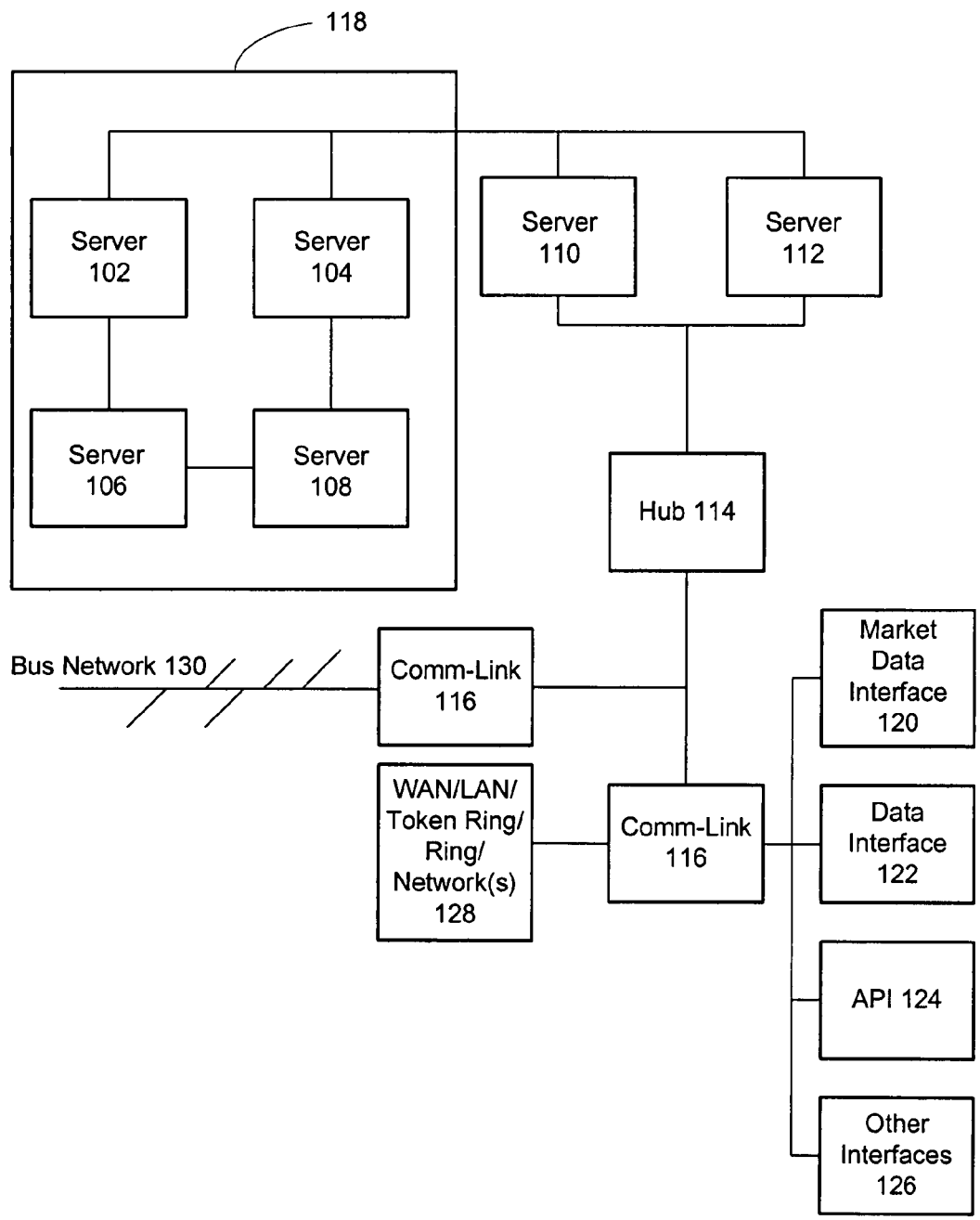
FIG. 1 is a system diagram encompassing a present embodiment.

FIG. 1 is a system diagram encompassing a present embodiment. The figure illustrates a hub-and-spoke system, wherein each resource, application, or order flows through a single entity (e.g., the hub 114) before being received by servers 110-112. In this embodiment, the hub 114 and the servers 102-112 may be integrated into a single server or comprise a server cluster made up of a group of independent computers that work together as a single system but present the appearance of a single server to one or more clients.

In FIG. 1, the clients are illustrated as interfaces 120-126, and one or more networks such as a wide area network ("WAN"), a local area network ("LAN"), a ring network, a token ring network, a bus network, 128 and 130, etc. Other peripheral devices may be coupled to hub 114, such as a printer, a speaker, and/or any other device.

Preferably, the hub 114 comprises a management server. The management server receives, converts, and transfers data in a form compatible with protocols used by servers 110-112, a communication link 116, the interfaces 120-126, and/or the networks 128 and 130. The interfaces may include an application programming interface (an "API") 124, a data interface 122, a market data interface 120, and/or other interfaces 126, for example. Preferably, the market data interface 120 provides quote vendors with access to selected output disseminated from the hub 114.

In FIG. 1, the hub 114 provides routing control to a trade matching system, such as an automated trading engine shown as servers 110 and 112. When orders are matched automatically by a matching algorithm or system within one or both of the servers 110 and/or 112, preferably the details of the trade and information of interest to the market are disseminated to quote vendors and trade participants that include the buyers and the sellers.

Figure 2:
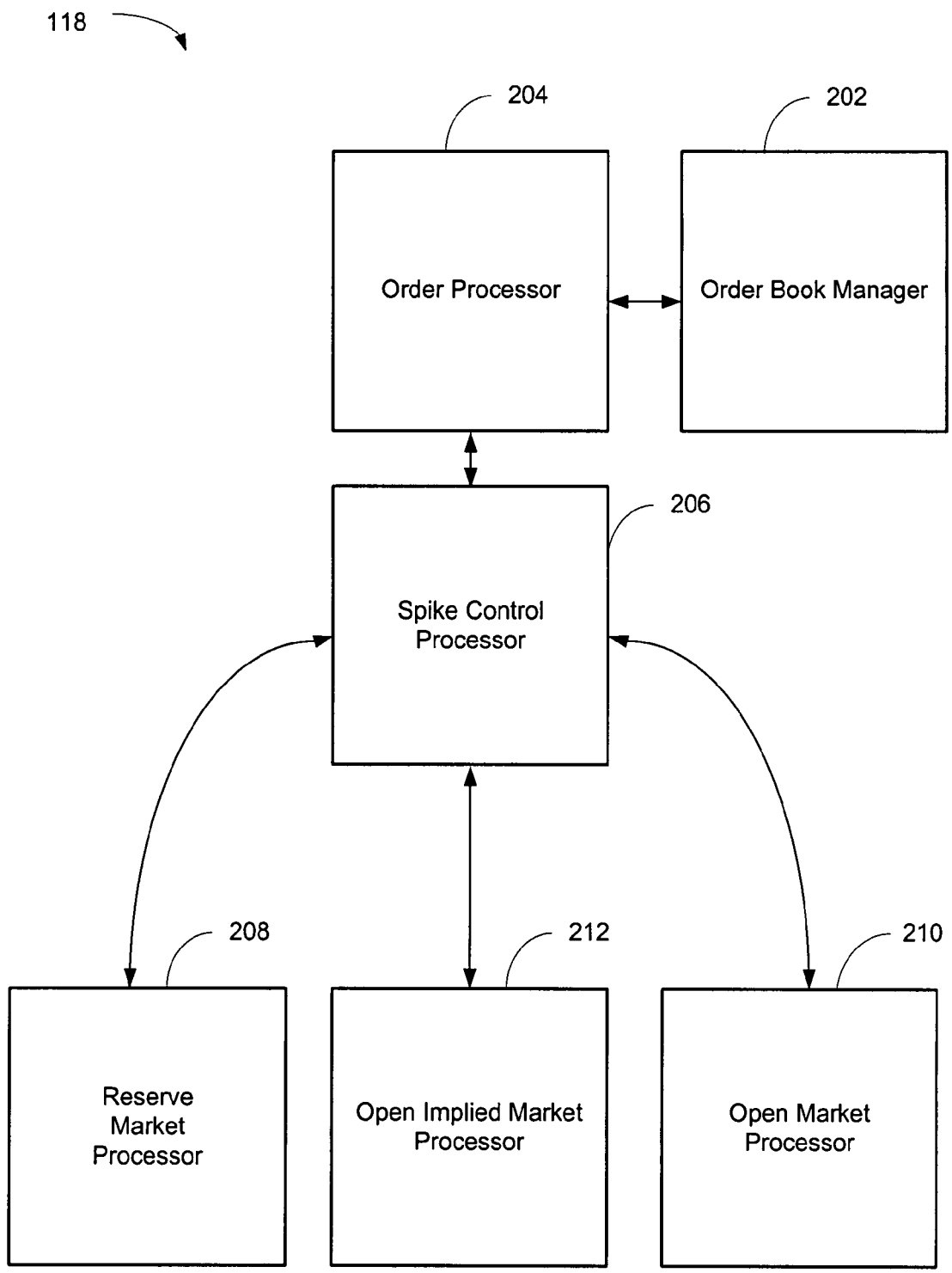
FIG. 2 is a block diagram of a trade evaluation system of FIG. 1.
Figure 3:
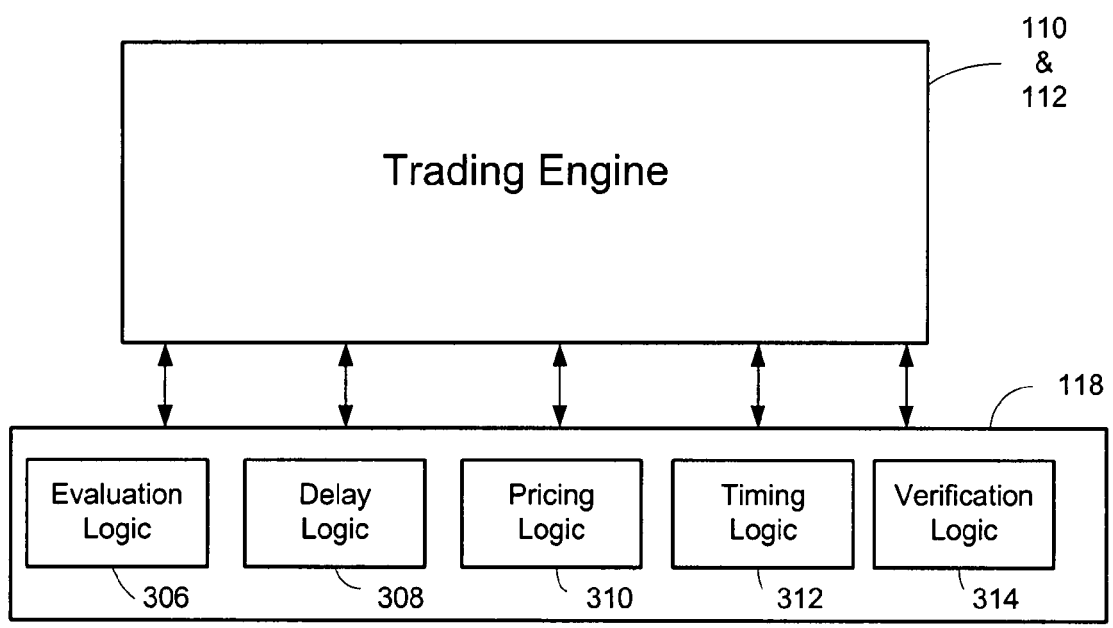
FIG. 3 is a block diagram of an alternative trade evaluation system of FIG. 1.

Preferably, the trade evaluation system 118, shown as servers 102-108 in FIG. 1 interfaces the hub 114. In the embodiment of FIG. 2, the trade evaluation system 118 may include an order book manager 202, an order processor 204, a spike control processor 206, a reserve market processor 208, an open market processor 210, and an open implied market processor 212. In FIG. 3, the trade evaluation system 118 may include evaluation logic 306, delay logic 308, pricing logic 310, timing logic 312 and verification logic 314. Preferably, the evaluation logic 306 and the order processor 204 calculate a price threshold, or a price that extends above or below a selected or a theoretical price. Such a threshold or interval may be fixed within a number of ticks above and below a last traded price. The threshold or interval may vary by product, instrument, contract, or other relevant market considerations.

When the system is used in a futures exchange, the price threshold or range may comprise a no-bust range that defines a price interval within which transactions that fall within that interval are not subject to cancellation by the exchange. Preferably, trades that fall within the no-bust range do not have a significant adverse effect on the market, and therefore, the trade stands even in error. In these embodiments, the trades that fall within the no-bust range cannot be cancelled by agreement. In other embodiments, trades that fall within the no-bust range may be cancelled by an agreement between market participants.

Preferably, the market data interfaces 120, the data interfaces 122, the networks 128 and 130, the APIs 124 and the other interfaces 126 provide market participants, quote vendors, and others with real and/or delayed time access to trade data. The trade data can include investment prices such as futures contract prices, settlement prices, bids, offers, and other exchange related or derived information. In some embodiments, inter-process communication methods, such as a Dynamic Data Exchange ("DDE") and/or an Object Linking and Embedding ("OLE") are used to exchange data and commands between two or more servers or applications that run simultaneously.

As shown in FIG. 2, the trade evaluation system 118 includes an order book manager 202, an order processor 204, a spike control processor 206, a reserve market processor 208, an open market processor 210, and an open implied market processor 212. Preferably, orders flow into the order processor 204 and are maintained by the order book manager 202. The order book manager 202 may maintain the exchange's order books, manage communication with an automated trading engine, and allow an exchange administrator to establish order filters (e.g., trading authorizations, instrument access, price bands, trading limits, etc.).

The order book manager 202 may also retain a predetermined or a programmable parameter used by order process logic or the order processor 204. In this embodiment, instrument parameters are stored in a table of rows and columns. In another embodiment, the parameters are stored in a data structure comprising a list of entries that use a unique key to identify each entry. The data structure may include a set of related values such as a linked list that use a common indexing scheme. In these embodiments, an instrument is reserved when the instrument is stored in a data table or data structure.

Preferably, parameters are initialized on start up of an automated trading engine and are maintained for a predetermined period of time such as a trading week. When a conditional order is triggered in a futures market, such as a stop order that enters the market at a limit or market price, the order processor 204 compares an execution price of the stop order to a predetermined price threshold such as a no-bust range. Preferably, this comparison determines if the transaction may be completed. If an execution price lies outside of the predetermined price threshold, the order processor 204 notifies the spike control processor 206.

Once notified, the spike control processor 206 reserves the instrument through a reserve market processor 208 and activates a verification timer. The spike control processor 206 may also reserve implied markets related to or based off the reserved instrument. Implied markets may include orders for implied spreads that include legs for related products and instruments. The verification timer may measure a time interval that varies in length in relation to a time of day, a product, a trader's location, market volatility, and/or any other relevant market conditions or combination of market conditions. At the end of an initial time period, the spike control processor 206 compares an indicative opening price to the predetermined price threshold. If the indicative opening price is above/below the predetermined threshold, the verification timer is reactivated for an additional iteration that may vary with one or more market conditions. In this embodiment, the indicative opening price is a changing price that may be based on an indicative trade, a better bid, or a better offer. Similarly, a predetermined price threshold may comprise a dynamic price range that changes with each iteration.

The spike control processor 206 will reserve a market unless the indicative opening price lies within the predetermined price threshold, a predetermined number of iterations or time periods lapse, or a manual intervention occurs. When one of those conditions occurs, the spike control processor 206 notifies the open market processor 210 to open the market. The spike control processor 206 will also reserve an implied market related to or based off a reserved instrument until all the products within an associated trading unit are not in reserve. Once all the products within an associated trading unit of an implied spread are not in reserve, the spike control processor 206 notifies the open implied market processor 212 to open the implied market.

One variable utilized by the spike control processor 206 identifies the duration that an instrument may be held in reserve. A price verification time variable is invoked and a timer activated when the order processor 204 invokes the spike control processor 206. The price verification time variable comprises a programmable or a constant time value.

The spike control processor 206 also uses a price iteration variable. The price iteration variable comprises a programmable multiplier. Preferably, the product of the price iteration variable and price verification time variable calculates a maximum length of time an instrument may remain in a reserved state. If the price verification time variable is five seconds and the price iteration variable is eleven, the maximum time the market may be in a reserved state is fifty-five seconds. The time variables are initialized on start up and are maintained for a length of time, such as a trading week. If the variables are changed before the period lapses, such as in the middle of a trading week, the variables may be update in a real or a delayed time.

Another embodiment of the trade evaluation system 118 shown in FIG. 3 couples an automated trading engine 110 and 112. In this embodiment, the trade evaluation system includes evaluation logic 306, delay logic 308, pricing logic 310, timing logic 312, and verification logic 314. Preferably, the evaluation logic 306 monitors orders submitted to an automated matching system or automated trading engine 110 and 112. The evaluation logic 306 may compare an execution price of a conditional order such as a stop order to a predetermined price range. Preferably, the price ranges reflects a range of prices that extend above and below an actual or synthetic market price. The price range may differ by product, may be fixed within a number of ticks above and below an actual or synthetic market price, or may vary above and below an actual or synthetic market price. Additionally, a synthetic no bust range may also be used including the no bust ranges disclosed in U.S. application Ser. No. 10/405,025 entitled System and Method for Monitoring Trades of a No-Bust Range in an Electronic Trading System, which is incorporated by reference in its entirety.

While in some embodiments price comparisons occur in delayed or batch time, preferably the comparison occurs in real-time, such as within a narrow time period after a potential trade would occur. If the price of the trade is within the price range, the trade stands and an open continuous trading is maintained. If the price of the trade caused by the execution of conditional orders falls outside of the price range, the evaluation logic 306 places the product into a reserved state. Upon reservation of the product, the delay logic 308 determines a maximum time the market may remain in a reserved state.

Pricing logic 310 derives an opening price at which a product would trade upon the opening of the market or an equilibrium price that falls substantially within the overlap of the pending bid and offer prices. The pricing logic 310 calculates opening prices upon demand, in delayed-time, or in real-time as orders are received. The delay logic 308 delays the matching of orders submitted to the automated trading engine 110 and 112. The delay will reserve a product until an opening price lies within a price range, a period of time lapses, or an automated or a manual intervention occurs. Price ranges, delay, and/or the measure of time are retained in an audit trail and/or memory coupled to or resident to the evaluation system 118. The tracking and/or storage of one or more of these values can preserve market integrity and allow an exchange to review an event.

Figure 4:
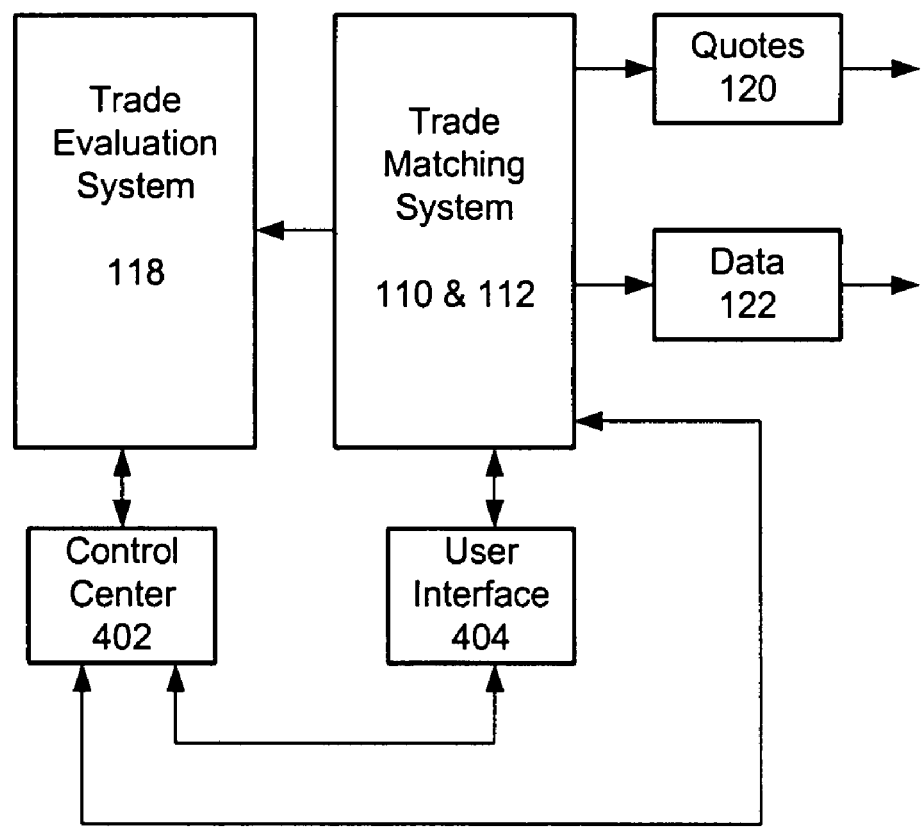
FIG. 4 is a block diagram of FIG. 1.

An instrument of an implied spread order may also be held in reserve. Before the implied matching is re-enabled, the verification logic 314 may look at the other instruments in the trading unit to verify that the other instruments within the trading unit are not held in reserve. A trading unit may include related products and instruments, and the orders for these other instruments may be used to populate implied spread markets. The relationship of the products and instruments may be stored within a database within the trading system, and the verification logic 314 may access the database to determine which products and instruments may be part of an implied spread trading unit. When the verification logic 314 determines that no other instruments within the trading unit are held in reserve, the implied spread tables for the trading unit are re-populated. If the verification logic 314 identifies at least one other instrument of the trading unit held in reserve, the verification logic 314 will delay the matching of implied spread orders until the reserve for all instruments within the trading unit is removed As shown in FIG. 4, one or more of the components that comprise the trade evaluation system 118 of FIGS. 2 and/or 3 may couple a control center 402 and the trade matching system 110 and 112. Preferably, the trade matching system 110 and 112 uses one or more matching systems or methods, such as a "first in, first out" ("FIFO"), an allocation, a hybrid price/time priority, such as a Lead Market Maker ("LMM"), for example, or any other matching systems or methods to automatically match orders. Once the details of the orders are entered through a user interface 404, preferably, the trade matching system 110 and 112 executes the trade and transmits matched trade data (e.g., instrument type, the price, the quantity, the buyer, the seller, etc.) to the trade evaluation system 118 and the user interface 404. The trade matching system 110 and 112 also transmits matched trade data and quote data to the quote and data vendors 120 and 122. Preferably, the matched trade data and quote data describe recent market movements.

Through a control center 404, preferably an exchange or a member of the exchange oversees the reservation of products in the market. The control center 404 may manually or automatically override the trade evaluation system 118 or perform a state change on any product, instrument, parameter, or group. The control center may view, configure, and program the predetermined price thresholds and timing variables of FIG. 2 to any market condition or combination of market conditions just as it may view, configure, and program the logic of FIG. 3 to such market conditions.

To assure that market participants and the exchange are aware of the status of the market or any changes to thresholds, variables, or logic, preferably, the evaluation system 118 may provide a notice to the user interfaces 120-126 (FIG. 1) and 404 (FIG. 4), the control center 404 (FIG. 4), and any communication system. In some instances, each of the embodiments may provide selected notices only to the control center 404, allowing the exchange to notify the market of certain conditions if needed through a messaging system.

Because market participants may not be aware that a product or an instrument is reserved due to the large volume of messages sent over an electronic trading system or because the market participants are no longer trading, the present system and method also may encompass independent communication systems that are coupled to the trade evaluation system 118 to convey information, warnings, or alerts about an instrument in a reserved state. Such systems can include devices that send and/or receive messages via telecommunication or wireless links such as portable phones, personal digital assistants ("PDAs"), and/or electronic mail devices, devices that send and/or receive images and can print them on a tangible media such as faxes, etc. Preferably, these systems make market participants aware of the state of the market in a narrow timeframe.

The present system and method mitigates or prevents market spikes caused by the triggering, election, and trading of conditional orders. The present system and method also mitigates or prevents market spikes and inaccurate quotes for implied spreads caused by the triggering, election, and trading of conditional orders on one or more related instruments of a trading unit. An embodiment of the method may be translated into a computer readable medium, programming instructions (e.g., code), or information that can be stored and retrieved from a volatile or non-volatile memory.

Figure 5:
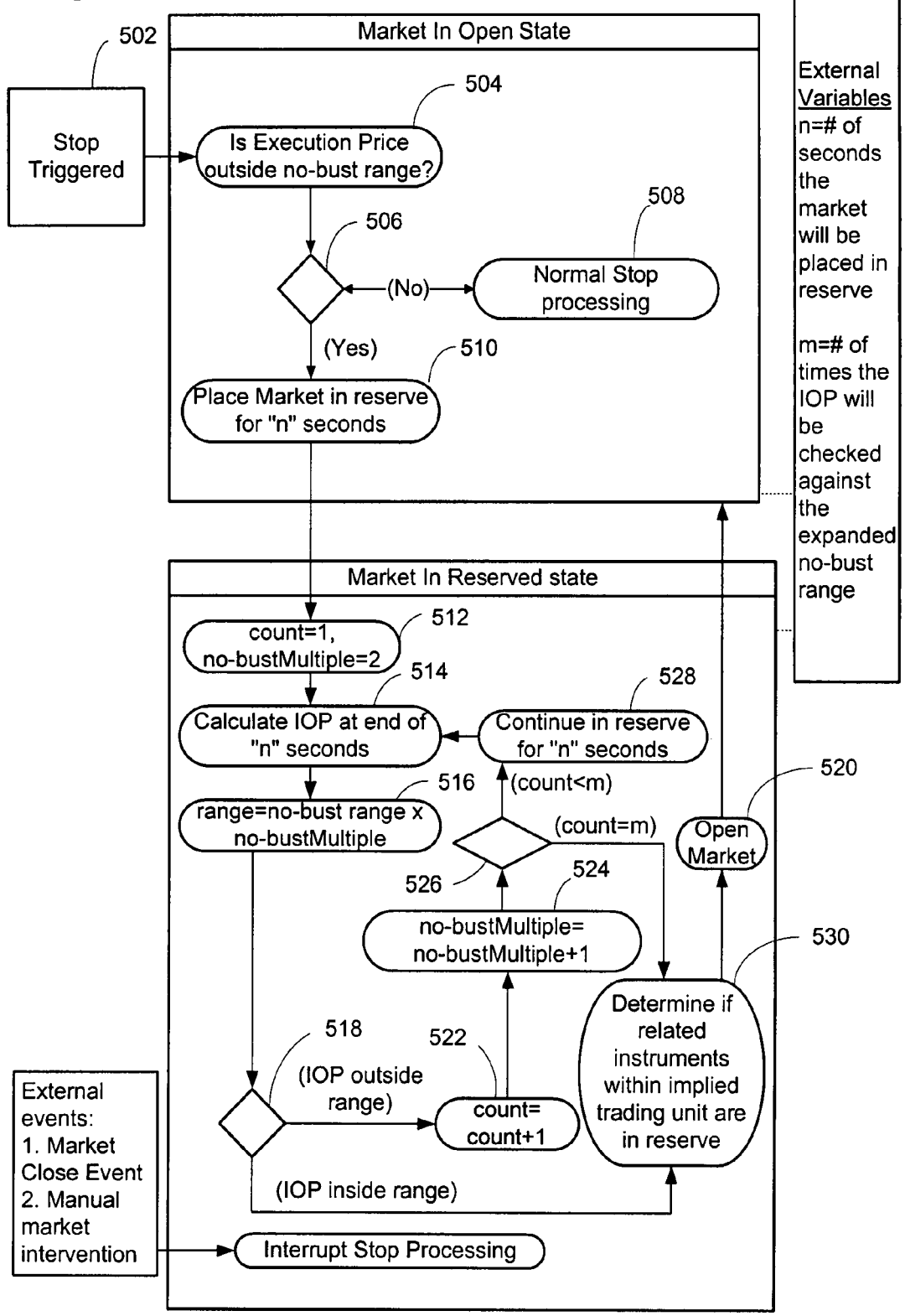
FIG. 5 is a flow diagram of an embodiment.

Any exchange, such as a futures exchange that enforces a no-bust range or another price range may use the method shown in FIG. 5. The method may be encoded in a signal bearing medium, a computer readable medium such as a memory, programmed within a device such as one or more integrated circuits, or processed by a controller, a computer, a server, or a server cluster. If the methods are performed by code or software, the code or software may reside in a memory resident to or interfaced to the trade matching system 110 and 112 of FIG. 1 or 3, a communication interface, or any other type of non-volatile or volatile memory interfaced or resident to the trade evaluation system 118 of FIG. 2. The memory may include an ordered listing of executable instructions for implementing logical functions. A logical function may be implemented through digital circuitry, through source code, or through analog circuitry. The code or software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine-readable medium," "propagated-signal" medium, and/or "signal-bearing medium" includes any and all systems, components, apparatuses, and/or devices that contain, store, communicate, propagate, and/or transport code or software for use by or in connection with an instruction executable system, component, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection having one or more wires, a portable magnetic or optical disk, a volatile memory such as a Random Access Memory "RAM," a Dynamic Random Access Memory (DRAM), a Read-Only Memory "ROM," an Erasable Programmable Read-Only Memory (EPROM or Flash memory), an electrical Erasable Programmable Read-Only Memory (EEPROM), and an optical fiber (optical). A machine-readable medium may also include a tangible medium upon which code or software is printed, as the code or software may be translated into a high-level language that may be compiled through a scanner, and/or interpreted or otherwise processed. The processed medium may then be stored in a computer and/or machine memory.

As shown in FIG. 5, a stop order is triggered and enters the market at a limit price or at a market price at act 502. In this embodiment, a stop order, sometimes called a stop-loss order, or simply a stop, is an order to buy or sell at a limit price when the market reaches a specified price. A limit price is a specified price or a price that is more favorable to the trader. A limit order to buy will be executed at or below the specified price limit. A limit order to sell will be executed at or above the specified price limit.

At act 504, the method compares an execution price to a no-bust range that is calculated separately for each product or instrument. The no-bust range may comprise a synthetic price range or a last traded price plus or minus a no bust-range variable.

If the price of the trade lies within the no-bust range, the trade stands and open continuous trading is maintained at acts 506 and 508. The process will then be applied each time a stop order would create a trade. A price comparison is performed at each tradable price level of the market.

If the price of the trade falls outside of the no-bust range, preferably, the product is placed into a reserved state at acts 506 and 510. Preferably, any implied spreads related to the product are also placed into a reserved state or cleared at acts 506 and 510. For example, related products or instruments that form legs of an implied spread order may be placed in reserve at acts 506 and 510. Upon its reservation, a timer that is coupled to or resident to an automated trading engine is activated. A counter will also be activated to track the number of times an indicative opening price verification process is performed.

In the illustrated embodiment, the counter is initialized to "1" at act 512. Preferably, the counter cannot exceed a value that is retained in a table or a data structure. If more than one comparison to an indicative opening price occurs, a varying price range (e.g., an expanded no-bust range) will be determined for verification of an indicative opening price. The varying price range may comprise a product of the no-bust range and a multiplier. Preferably, the multiplier increases incrementally or in multiples each time an indicative opening price verification occurs.

Once a predetermined length of time lapses, an indicative opening price and a price range are calculated and broadcast to the market through a data feed at acts 514 and 516. The indicative opening price represents a price at which a product would trade upon an opening of a market. An indicative opening price may comprise an equilibrium price that falls within an overlap of bid and offer prices.

A comparison of an indicative opening price to a calculated price range occurs at act 518. If the indicative opening price lies within the price range, the process may verify that related products and instruments within an implied trading unit are not being held in reserve at act 530. When all related products and instruments within an implied trading unit are verified as not being held in reserve, the market may open at act 520, and trading begins at the indicative opening price or a market price. The process resumes when another stop order is triggered at act 502.

If the indicative opening price lies outside of the price range, process variables are incremented at acts 522 and 524, and the process continues until a predetermined number of iterations is reached at act 526. When a maximum number of iterations are reached, the process may verify that related products and instruments within an implied trading unit are not being held in reserve at act 530. Once related products within an implied trading unit are verified as not being held in reserve, a product may reopen at act 520 and the process resumes when another stop order is triggered at act 502.

If a maximum number of iterations is not reached, the process resumes when the time variable is read or programmed at act 528 and another indicative opening price is calculated. At act 514, the indicative opening price is a dynamic price that changes as orders are entered into the market and pending orders are modified, and/or cancelled. The present method continues until a predetermined number of iterations is reached or an external event occurs. An external event may include the closing of the market or a manual market intervention.

The above-described embodiments scale well to large networks, to new products, or to the large volatility that occurs in the markets that trade popular contracts. The embodiments may facilitate any exchange between buyers and sellers, including markets that exchange equities, debt, investment indices, and other investments as well as any commodity or combination or series of commodity contracts, such as bundles that can comprise the purchase of one of a series of consecutive contracts.

When the trade evaluation system 118 is integrated or linked to an automated trading engine that matches spreads, all related spreads are automatically reserved when the spread lies outside of a predetermined threshold. When reserved, all related spread instruments are reserved and any implied spreading becomes inactive. When the market is allowed to open, all spreads, including implied spreads, corresponding to an underlying leg may open.

As shown in FIG. 4, the trade evaluation system 118 may couple a control center 402. Through the control center an exchange administrator may take an appropriate action on a spread and manually open corresponding spreads. Under these circumstances the implied spreading will remain inactive for a remainder of a trading session. An exchange administrator may also set a group of differing contracts to a pre-opening, take appropriate action on the spread, and reset an opening for the group of differing contracts.

The present embodiments described above provide exchanges and users with a flexible approach and structure that mitigates or prevent sharp rises or declines in market prices due to the triggering, election, and trading of conditional orders. To further illustrate the present embodiments, exemplary markets are described and illustrated.

In a first example, a price verification time is programmed to five seconds and the initial no-bust range is six.

| | | | ESM3 | | | |
|---|---|---|---|---|---|---|
| TON | | QTY | BID | ASK | QTY | TON |
| TON 6 | Stop (88075) | 5 | 88475 | 87375 | 10 | TON 1 |
| TON 7 | Stop (87875) | 5 | 88475 | 87475 | 5 | TON 2 |
| TON 8 | Stop (87825) | 5 | 88325 | 87675 | 5 | TON 3 |
| TON 9 | Stop (87675) | 5 | 88475 | 87900 | 1 | TON 4 |
| TON 10 | Stop (87525) | 5 | 88475 | 88075 | 1 | TON 5 |
| TON 11 | Stop (87375) | 10 | 87900 | | | |
| TON 12 | Stop (87375) | 10 | 87675 | | | |
| Incoming | | 1 | 87375 | | | |

With the market in a continuous trading state, the following sequence occurs when an Incoming—Buy of 1 @ 873.75 enters the market:

Trade 1 Incoming (1-lot) trades with TON 1 (1-lot) at 873.75;

TON 12-Stop (87375), TON 11-Stop (87375) are triggered by Trade 1;

Trade 2 TON 12 (9-lot) trades with TON 1 (9-lot) at 873.75;

Trade 3 TON 12 (1-lot) trades with TON 2 (1-lot) at 874.75;

Trade 4 TON 11 (4-lot) trades with TON 2 (4-lot) at 874.75;

Trade 5 TON 11 (5-lot) trades with TON 3 (5-lot) at 876.75;

TON 10-Stop (87525), TON 9-Stop (87675) are triggered by Trade 5;

Trade 6 TON 11 (1-lot) trades with TON 4 (1-lot) at 879.00; and

TON 8-Stop (87825) and TON 7-Stop (87875) are triggered by Trade 6.

The market is placed in a reserved state because the trade that would occur at a price of 880.75 would violate the no bust range. The no bust range for ES is currently 20 six. Since the stop iteration began with a trade price of 873.75, the market will not trade past a price of 879.75. The order book will display the following in a reserved state:

| | | ESM3 | | | |
|---|---|---|---|---|---|
| TON # | QTY | BID | ASK | QTY | TON # |
| TON 6 | Stop (88075) 5 | 88475 | 88075 | 1 | TON 5 |
| TON 10 | 5 | 88475 | | | |
| TON 9 | 5 | 88475 | | | |
| TON 7 | 5 | 88475 | | | |
| TON 8 | 5 | 88325 | | | |

After waiting a predetermined length of time, if the indicative opening price is greater than twice the no bust range (12.00 from the original last price), the market will remain in a reserved state for a second time iteration. In this example, the market will be allowed to open at or near the end of the five second delay and the following trade will take place using normal indicative opening price logic:

Trade 7 TON 10 (1-lot) trades with TON 5 (1-lot) at 880.75; and

TON 6-Stop (88075) is triggered by Trade 7.

| | ESM3 | | |
|---|---|---|---|
| QTY | BID | ASK | QTY |
| 19 | 88475 | | |
| 5 | 88325 | | |

In a second example, an imbalance condition occurs during execution of a single conditional order. When a sell order enters the market for a quantity of 1 at 860.00, a cascade of stop orders is triggered. In this example, the minimum price that can be traded for this trading session is 854.00.

| | | ESM3 | | | |
|---|---|---|---|---|---|
| TON | QTY | BID | ASK | QTY | TON |
| TON 1 | 1 | 86000 | 85300 | 6 | Stop (86000) TON 6 |
| TON 2 | 1 | 85900 | | | |
| TON 3 | 1 | 85800 | | | |
| TON 4 | 2 | 85400 | | | |
| TON 5 | 1 | 85300 | | | |
| | | | 86000 | 1 | Incoming |

With the market in a continuous trading state, the following sequence occurs when an Incoming—Sell of 1 @ 860.00 enters the market:

Trade 1 Incoming (1-lot) trades with TON 1 (1-lot) at 860.00;

TON 6-Stop (86000) is triggered by Trade 1;

Trade 2 TON 2 (1-lot) trades with TON 6 (1-lot) at 859.00;

Trade 3 TON 3 (1-lot) trades with TON 6 (1-lot) at 858.00; and

Trade 4 TON 4 (2-lot) trades with TON 6 (2-lot) at 854.00.

The market is placed in a reserved state because the trade that would occur at a price of 853.00 would violate the no bust range. Since the stop iteration began with a trade price of 860.00, the market will not trade past a price of 854.00. The order book will display the following in a reserved state:

| | | ESM3 | | | |
|---|---|---|---|---|---|
| TON # | QTY | BID | ASK | QTY | TON # |
| TON 5 | 1 | 85300 | 85300 | 1 | TON 6 |

After waiting the preset length of time, if the indicative opening price is greater than twice the no bust range (12.00 from the original last price), the market will remain in a reserved state for a second time iteration. In this example, the market will be allowed to open at or near the end of the five second delay and the following trade will take place:

Trade 5 TON 5 (1-lot) trades with TON 6 (1-lot) at 853.00.

| | ESM3 | | |
|---|---|---|---|
| QTY | BID | ASK | QTY |

In a third example, an upper no bust range violation occurs. Like the other examples, the price verification time is programmed to about a five second interval and the initial no-bust range is about six.

In this example, a buy order enters the market for a quantity of at 873.75. The maximum price that can be traded for this trading iteration is 879.75.

| | | ESM3 | | | |
|---|---|---|---|---|---|
| TON | QTY | BID | ASK | QTY | TON |
| TON 12 | Stop (87375) 10 | 87675 | 87375 | 10 | TON 1 |
| TON 11 | Stop (87375) 10 | 87900 | 87475 | 5 | TON 2 |
| TON 10 | Stop (87525) 5 | 88475 | 87675 | 5 | TON 3 |
| TON 9 | Stop (87675) 5 | 88475 | 87900 | 1 | TON 4 |
| TON 8 | Stop (87825) 5 | 88325 | 88475 | 1 | TON 5 |
| TON 7 | Stop (87875) 5 | 88475 | | | |
| TON 6 | Stop (88075) 5 | 88475 | | | |
| Incoming1 | 1 | 87375 | | | |

With the market in a continuous trading state, the following sequence occurs if Incoming1—Buy of 1 @ 873.75 enters the market:

Trade 1 Incoming1 (1-lot) trades with TON 1 (1-lot) at 873.75;

TON 12-Stop (87375), TON 11-Stop (87375) are triggered by Trade 1;

Trade 2 TON 11 (9-lot) trades with TON 1 (9-lot) at 873.75;

Trade 3 TON 11 (1-lot) trades with TON 2 (1-lot) at 874.75;

Trade 4 TON 12 (4-lot) trades with TON 2 (4-lot) at 874.75;

Trade 5 TON 12 (5-lot) trades with TON 3 (5-lot) at 876.75;

TON 10-Stop (87525), TON 9-Stop (87675) are triggered by Trade 5;

Trade 6 TON 10 (1-lot) trades with TON 4 (1-lot) at 879.00; and

TON 8-Stop (87825) and TON 7-Stop (87875) are triggered by Trade 6.

The market is placed in a reserved state because the trade that would occur at a price of 884.75 would violate the no bust range. The no bust range for ES is currently six. Since the stop iteration began with a trade price of 873.75, the market will not trade past a price of 879.75. The order book will display the following in a reserved state:

| | | ESM3 | | | |
|---|---|---|---|---|---|
| TON | QTY | BID | ASK | QTY | TON |
| TON 10 | 4 | 88475 | 88475 | 1 | TON 5 |
| TON 9 | 5 | 88475 | | | |
| TON 7 | 5 | 88475 | | | |
| TON 6 | Stop (88075) Triggered in IOP | 5 | 88475 | | |
| TON 8 | 5 | 88325 | | | |
| TON 12 | 1 | 87675 | | | |

After waiting a predetermined length of time, if the indicative opening price is greater than twice the no bust range (12.00 from the original last price), the market will remain in a reserved state for a second time iteration. In this example, the market will be allowed to open at or near the end of the five second delay and the following trade will take place:
Trade 7 TON 10 (1-lot) trades with TON 5 (1-lot) at 884.75; and
TON 6-Stop (88075) is triggered by Trade 7.

| | ESM3 | | |
|---|---|---|---|
| QTY | BID | ASK | QTY |
| 18 | 88475 | | |
| 5 | 88325 | | |
| 1 | 87675 | | |

In a fourth example, a lower no bust range violation occurs. Like the other examples, the price verification time is programmed to about a five second interval and the initial no-bust range is about six.

In this example, a sell order enters the market for a quantity of 1 at 860.75. The maximum price that can be traded for this trading iteration is 854.75.

| | | ESM3 | | | |
|---|---|---|---|---|---|
| TON | QTY | BID | ASK | QTY | TON |
| TON 1 | 10 | 86075 | 85975 | 10 | Stop (86075) TON 7 |
| TON 2 | 5 | 86000 | 85900 | 5 | Stop (86000) TON 8 |
| TON 3 | 5 | 85900 | 85875 | 5 | Stop (85900) TON 9 |
| TON 4 | 5 | 85875 | 85500 | 5 | Stop (85875) TON 10 |
| TON 5 | 1 | 85500 | 85450 | 5 | Stop (85500) TON 11 |
| TON 6 | 10 | 85450 | | | |
| | | | 86075 | 1 | Incoming1 |

With the market in a continuous trading state, the following sequence occurs if Incoming1—Sell of 1 @ 860.75 enters the market:
Trade 1 Incoming1 (1-lot) trades with TON 1 (1-lot) at 860.75;
TON 7-Stop (86075) is triggered by Trade 1;
Trade 2 TON 1 (9-lot) trades with TON 7 (9-lot) at 860.75;
Trade 3 TON 2 (1-lot) trades with TON 7 (1-lot) at 860.00;
TON 8-Stop (86000) is triggered by Trade 3;
Trade 4 TON 2 (4-lot) trades with TON 8 (4-lot) at 860.00;
Trade 5 TON 3 (1-lot) trades with TON 8 (1-lot) at 859.00;
TON 9-Stop (85900) is triggered by Trade 5;
Trade 6 TON 3 (4-lot) trades with TON 9 (4-lot) at 859.00;
Trade 7 TON 4 (1-lot) trades with TON 9 (1-lot) at 858.75;
TON 10-Stop (85875) is triggered by Trade 7;
Trade 8 TON 4 (4-lot) trades with TON 10 (4-lot) at 858.75;
Trade 9 TON 5 (1-lot) trades with TON 10 (1-lot) at 855.00; and
TON 11-Stop (85500) is triggered by Trade 8.

The market is placed in a reserved state because the trade that would occur at a price of 854.50 would violate the no bust range. The no bust range for ES is currently six. Since the stop iteration began with a trade price of 860.75, the market will not trade past a price of 854.75. The order book will display the following in a reserved state:

| | | ESM3 | | | |
|---|---|---|---|---|---|
| TON | QTY | BID | ASK | QTY | TON |
| TON 6 | 10 | 85450 | 85450 | 5 | TON 11 |

After waiting a predetermined length of time, if the indicative opening price is greater than twice the no bust range (12.00 from the original last price), the market will remain in a reserved state for a second time iteration. In this example, the market will be allowed to open at or near the end of the five second delay and the following trade will take place:
Trade 10 TON 6 (5-lot) trades with TON 11 (5-lot) at 854.50.

| | ESM3 | | |
|---|---|---|---|
| QTY | BID | ASK | QTY |
| 5 | 85450 | | |

In a fifth example, a manual intervention occurs. Like the other examples, the price verification time is programmed to about a five second interval.

In this example, a sell order enters the market for a quantity of 1 at 874.00. The minimum price that can be traded for this trading iteration is 868.00. The ESM3 market should be reserved when violating the no bust range at 868.00. However, due to a manual intervention, the five-second iteration variable is overridden. The instrument will re-open by a manually initiating of an opening command.

| | | ESM3 | | | |
|---|---|---|---|---|---|
| TON | QTY | BID | ASK | QTY | TON |
| TON 1 | 10 | 87400 | 87325 | 10 | Stop (87400) TON 7 |
| TON 2 | 5 | 87350 | 87300 | 5 | Stop (87350) TON 8 |
| TON 3 | 5 | 87300 | 87250 | 5 | Stop (87300) TON 9 |
| TON 4 | 5 | 87250 | 86800 | 5 | Stop (87250) TON 10 |
| TON 5 | 1 | 87250 | 86750 | 5 | Stop (87250) TON 11 |
| TON 6 | 10 | 86750 | 86750 | 10 | Stop (87250) TON 12 |
| | | | 87400 | 1 | Incoming1 |

With the market in a continuous trading state, the following sequence occurs if Incoming1—Sell of 1 @ 874.00 enters the market.
Trade 1 Incoming1 (1-lot) trades with TON 1 (1-lot) at 874.00;
TON 7-Stop (87400) is triggered by Trade 1;

Trade 2 TON 1 (9-lot) trades with TON 7 (9-lot) at 874.00;
Trade 3 TON 2 (1-lot) trades with TON 7 (1-lot) at 873.50;
TON 8-Stop (873.50) is triggered by Trade 3;
Trade 4 TON 2 (4-lot) trades with TON 8 (4-lot) at 873.50;
Trade 5 TON 3 (1-lot) trades with TON 8 (1-lot) at 873.00;
TON 9-Stop (87300) is triggered by Trade 5;
Trade 6 TON 3 (4-lot) trades with TON 9 (4-lot) at 873.00;
Trade 7 TON 4 (1-lot) trades with TON 9 (1-lot) at 872.50;
TON 10-Stop (87250), TON 11-Stop (87250), and TON 12-Stop (87250) are triggered by Trade 7;
Trade 8 TON 4 (4-lot) trades with TON 10 (4-lot) at 872.50; and
Trade 9 TON 5 (1-lot) trades with TON 10 (1-lot) at 872.50.

The market is placed in a reserved state because the trade that would occur at a price of 867.50 would violate the no bust range. The no bust range for ES is currently six. Since the stop iteration began with a trade price of 874.00, the market will not trade past a price of 868.00. The order book will display the following in a reserved state:

| | | ESM3 | | | |
|---|---|---|---|---|---|
| TON | QTY | BID | ASK | QTY | TON |
| TON 6 | 10 | 86750 | 86750 | 5 | TON 11 |
| | | | 86750 | 10 | TON 12 |

Due to a manual intervention, the instrument will not re-open until an exchange administrator performs an alternate manual intervention to re-open the market.

In a sixth example, a price comparison to a multiple of the no-bust range occurs. When a sell order enters the market for a quantity of 1 at 865.75, a cascade of stop orders is triggered. The minimum price that may be traded for the first trading iteration is 859.75 (1x) and the minimum price that may be traded for the second iteration is 853.75 (2x). The ESM3 market will be reserved at 859.75 (one iteration) and 853.75 (two iterations).

| | | ESM3 | | | |
|---|---|---|---|---|---|
| TON | QTY | BID | ASK | QTY | TON |
| TON 1 | 10 | 86575 | 86550 | 10 | Stop (86575) TON 8 |
| TON 2 | 5 | 86550 | 86450 | 5 | Stop (86550) TON 9 |
| TON 3 | 5 | 86500 | 86200 | 5 | Stop (86500) TON 10 |
| TON 4 | 5 | 86450 | 86250 | 5 | Stop (86450) TON 11 |
| TON 5 | 1 | 86250 | 86150 | 5 | Stop (86250) TON 12 |
| TON 6 | 10 | 86200 | 85300 | 10 | Stop (86200) TON 13 |
| TON 7 | 5 | 85300 | | | |
| | | | 86575 | 1 | Incoming1 |

With the market in a continuous trading state, the following sequence occurs if Incoming1—Sell of 1 @ 865.75 enters market:
Trade 1 Incoming1 (1-lot) trades with TON 1 (1-lot) at 865.75;
TON 8-Stop (86575) is triggered by Trade 1;
Trade 2 TON 1 (9-lot) trades with TON 8 (9-lot) at 865.75;
Trade 3 TON 2 (1-lot) trades with TON 8 (1-lot) at 865.50;
TON 9-Stop (86550) is triggered by Trade 3;
Trade 4 TON 2 (4-lot) trades with TON 9 (4-lot) at 865.50;
Trade 5 TON 3 (1-lot) trades with TON 9 (1-lot) at 865.00;
TON 10 Stop (86500) is triggered by Trade 5;
Trade 6 TON 3 (4-lot) trades with TON 10 (4-lot) at 865.00;
Trade 7 TON 4 (1-lot) trades with TON 10 (1-lot) at 864.50;
TON 11-Stop (86450) is triggered by Trade 7;
Trade 8 TON 4 (4-lot) trades with TON 11 (4-lot) at 864.50;
Trade 9 TON 5 (1-lot) trades with TON 11 (1-lot) at 862.50;
TON 12-Stop (86250) is triggered by Trade 9;
Trade 10 TON 6 (5-lot) trades with TON 12 (5-lot) at 862.00;
TON 13-Stop (86200) is triggered by Trade 10; and
Trade 11 TON 6 (5-lot) trades with TON 13 (5-lot) at 862.00.

The market is placed in a reserved state because the trade that would occur at a price of 853.00 would violate the no bust range. The no bust range for ES is currently six. Since the stop iteration began with a trade price of 865.75, the market will not trade past a price of 859.75 (1x) and 853.75 (2x). The order book will display the following in a reserved state:

| | | ESM3 | | | |
|---|---|---|---|---|---|
| TON | QTY | BID | ASK | QTY | TON |
| TON 7 | 5 | 85300 | 85300 | 5 | TON 13 |

After waiting a predetermined length of time, if the indicative opening price (853.00) is greater than twice the no bust range (12.00 from the original last price), the market will remain in a reserved state for a second time iteration. In this example, the market will repeat a second iteration in a reserve state. After the second iteration, the market will again validate the indicative opening price and the market will re-open because the indicative opening price (853.00) is within the new price range.

Trade 12 TON 7 (5-lot) trades with TON 13 (5-lot) at 853.00.

In a seventh example, an instrument is scheduled to close before the expiration of the stop price validation variable. If the instrument is currently in a reserve state due to a no bust range violation, the instrument will proceed to a closed state. The following sequence illustrates this example:

Price logic is violated due to the triggering of a stop order violating the no bust range.
The market is placed in a reserved state for an initial iteration of a predetermined time.
While the timer is measuring the timing interval, a group controller closes the instrument.
The stop price validation parameter is reset due to an override by the group controller.

In an eighth example, an imbalance condition occurs during execution of a single conditional order. The minimum price that can be traded for this trading iteration is 854.00.

| | | ESM3 | | | |
|---|---|---|---|---|---|
| TON | QTY | BID | ASK | QTY | TON |
| TON 1 | 1 | 86000 | 85300 | 6 | Stop (86000) TON 6 |
| TON 2 | 1 | 85900 | | | |
| TON 3 | 1 | 85800 | | | |
| TON 4 | 2 | 85400 | | | |
| TON 5 | 1 | 85300 | | | |
| | | | 86000 | 1 | Incoming1 |

With the market in a continuous trading state, the following sequence occurs if Incoming1—Sell of 1 @ 860.00 enters the market:
- Trade 1 Incoming1 (1-lot) trades with TON 1 (1-lot) at 860.00;
- TON 6-Stop (86000) is triggered by Trade 1;
- Trade 2 TON 2 (1-lot) trades with TON 6 (1-lot) at 859.00;
- Trade 3 TON 3 (1-lot) trades with TON 6 (1-lot) at 858.00; and
- Trade 4 TON 4 (2-lot) trades with TON 6 (2-lot) at 854.00.

The market is placed in a reserved state because the trade that would occur at a price of 853.00 would violate the no bust range. The no bust range for ES is currently six. Since the stop iteration began with a trade price of 860.00, the market will not trade past a price of 854.00. The order book will display the following in a reserved state:

| | | ESM3 | | | |
|---|---|---|---|---|---|
| TON | QTY | BID | ASK | QTY | TON |
| TON 5 | 1 | 85300 | 85300 | 2 | TON 6 |

After waiting a predetermined length of time, if the indicative opening price is greater than twice the no bust range (12.00 from the original last price), the market will remain in a reserved state for a second time iteration. In this example, the market will be allowed to open at the end of the five second delay and the following trade will take place:
- Trade 5 TON 5 (1-lot) trades with TON 6 (1-lot) at 853.00.

| | ESM3 | | |
|---|---|---|---|
| QTY | BID | ASK | QTY |
| | | 85300 | 1 |

In a ninth example, the market is in a reserved state. Additional orders are entered which alter the indicative opening price and allow the market to open. If the new limit orders were not entered, the market would have remained reserved due to violation of the no bust limit.

| | | ESM3 | | | |
|---|---|---|---|---|---|
| TON | | QTY | BID | ASK | QTY | TON |
| TON 21 | Stop (85400) | 5 | 85525 | 85400 | 1 | TON 1 |
| TON 20 | Stop (85525) | 5 | 85625 | 85525 | 5 | TON 2 |
| TON 19 | Stop (85625) | 5 | 85775 | 85625 | 5 | TON 3 |
| TON 18 | Stop (85775) | 5 | 85950 | 85775 | 5 | TON 4 |
| TON 17 | Stop (85950) | 5 | 86025 | 85950 | 5 | TON 5 |
| TON 16 | Stop (86025) | 5 | 86350 | 86025 | 5 | TON 6 |
| TON 10 | Stop (86550) | 5 | 86600 | 86600 | 5 | TON 7 |
| TON 9 | Stop (86550) | 5 | 86650 | 86650 | 5 | TON 8 |
| Incoming1 | | 1 | 85400 | | | |

With the market in a continuous trading state, the following sequence occurs if Incoming1—Buy of 1 @ 854.00 enters the market:
- Trade 1 Incoming1 (1-lot) trades with TON 1 (1-lot) at 854.00;
- TON 21-Stop (85400) is triggered by Trade 1;
- Trade 2 TON 21 (5-lot) trades with TON 2 (5-lot) at 855.25;
- TON 20-Stop (85525) is triggered by Trade 2;
- Trade 3 TON 20 (5-lot) trades with TON 3 (5-lot) at 856.25;
- TON 19-Stop (85625) is triggered by Trade 3;
- Trade 4 TON 19 (5-lot) trades with TON 4 (5-lot) at 857.75;
- TON 18-Stop (85775) is triggered by Trade 4;
- Trade 5 TON 18 (5-lot) trades with TON 5 (5-lot) at 859.50; and
- TON 17-Stop (85950) is triggered by Trade 5.

The market is placed in a reserved state because the trade that would occur at a price of 860.25 would violate the no bust range. The no bust range for ES is currently six. Since the stop iteration began with a trade price of 854.00, the market will not trade past a price of 860.00. The order book will display the following in a reserved state:

| | | ESM3 | | | |
|---|---|---|---|---|---|
| TON | | QTY | BID | ASK | QTY | TON |
| TON 17 | | 5 | 86025 | 86025 | 5 | TON 6 |
| Incoming3 | | 5 | 86650 | 86550 | 5 | Incoming4 |
| Incoming2 | | 5 | 86650 | 86550 | 5 | Incoming5 |
| TON 10 | Stop (86550) | 5 | 86600 | 86600 | 5 | TON 7 |
| TON 9 | Stop (86550) | 5 | 86650 | 86650 | 5 | TON 8 |

As shown, during the reserve state, new orders were received. Due to the incoming orders, the indicative opening price is now 866.00. After waiting a predetermined length of time, if the indicative opening price (866.00) is greater than twice the no bust range (12.00 from the original last price), the market will remain in a reserved state for a second iteration. In this example, the market will be allowed to re-open because the indicative opening price (866.00) is within the new range (866.00).
- TON 10-Stop (86550) and TON 9-Stop (86550) is triggered by the indicative opening price;
- Trade 6 TON 10 (5-lot) trades with Incoming4 (5-lot) at 866.00;
- Trade 7 TON 9 (5-lot) trades with Incoming5 (5-lot) at 866.00;
- Trade 8 Incoming3 (5-lot) trades with TON 7 (5-lot) at 866.00; and
- Trade 9 Incoming2 (5-lot) trades with TON 6 (5-lot) at 866.00.

| | ESM3 | | |
|---|---|---|---|
| QTY | BID | ASK | QTY |
| 5 | 86025 | 86650 | 5 |

In a tenth example, the market is reserved. The indicative opening price is a better bid that violates the no bust range and the market remains reserved.

| | | ESM3 | | | |
|---|---|---|---|---|---|
| TON | | QTY | BID | ASK | QTY | TON |
| TON 11 | Stop (85400) | 5 | 85525 | 85400 | 1 | TON 1 |
| TON 10 | Stop (85525) | 5 | 85625 | 85525 | 5 | TON 2 |
| TON 9 | Stop (85625) | 5 | 85775 | 85625 | 5 | TON 3 |

-continued

| | | ESM3 | | | |
|---|---|---|---|---|---|
| TON | QTY | BID | ASK | QTY | TON |
| TON 8 | Stop (85775) | 5 | 85950 | 85775 | 5 | TON 4 |
| TON 7 | Stop (85950) | 5 | 86625 | 85950 | 5 | TON 5 |
| | | | | 86625 | 5 | TON 6 |
| Incoming1 | | 1 | 85400 | | | |

With the market in a continuous trading state, the following sequence occurs if Incoming1—Buy of 1 @ 854.00 enters the market:

Trade 1 Incoming1 (1-lot) trades with TON 1 (1-lot) at 854.00;
TON 11-Stop (85400) is triggered by Trade 1;
Trade 2 TON 11 (5-lot) trades with TON 2 (5-lot) at 855.25;
TON 10-Stop (85525) is triggered by Trade 2;
Trade 3 TON 10 (5-lot) trades with TON 3 (5-lot) at 856.25;
TON 9-Stop (85625) is triggered by Trade 3;
Trade 4 TON 9 (5-lot) trades with TON 4 (5-lot) at 857.75;
TON 8-Stop (85775) is triggered by Trade 4;
Trade 5 TON 8 (5-lot) trades with TON 5 (5-lot) at 859.50; and
TON 7-Stop (85950) is triggered by Trade 5.

The market is placed in a reserved state because the trade that would occur at a price of 866.25 would violate the no bust range. The no bust range for ES is currently six. Since the stop iteration began with a trade price of 854.00, the market will not trade past a price of 860.00. The order book will display the following in a reserved state:

| | | ESM3 | | | |
|---|---|---|---|---|---|
| TON | QTY | BID | ASK | QTY | TON |
| TON 7 | 5 | 86625 | 86625 | 5 | TON 6 |

During the reserved state, the remaining offer is cancelled (TON 6) and a new order is entered at a price of 867.00. The indicative opening price is currently an 867.00B (better bid).

| | | ESM3 | | | |
|---|---|---|---|---|---|
| TON | QTY | BID | ASK | QTY | TON |
| Incoming2 | 5 | 86700 | | | |
| TON 7 | 5 | 86625 | | | |

After waiting a predetermined length of time, the indicative opening price (867.00B) is outside the no bust range of 866.00(2×6.00) and the market will remain in reserved state for a second iteration. After the second iteration is exhausted, the indicative opening price lies within the no bust range and the market opens.

In an eleventh example, the market is reserved. Upon validation of an indicative opening price (an indicative opening price that is a better offer (A)), the market remains reserved because the indicative opening price violates the no bust range.

| | | ESM3 | | | |
|---|---|---|---|---|---|
| TON | QTY | BID | ASK | QTY | TON |
| TON 1 | 1 | 86525 | 86450 | 5 | Stop (86525) TON 7 |
| TON 2 | 5 | 86450 | 86400 | 5 | Stop (86450) TON 8 |
| TON 3 | 5 | 86400 | 86300 | 5 | Stop (86400) TON 9 |
| TON 4 | 5 | 86300 | 85300 | 5 | Stop (86300) TON 10 |
| TON 5 | 5 | 85300 | | | |
| | | | 86525 | 1 | Incoming1 |

With the market in a continuous trading state, the following sequence occurs if Incoming1—Sell of 1 @ 865.25 enters the market:

Trade 1 Incoming1 (1-lot) trades with TON 1 (1-lot) at 865.25;
TON 7-Stop (86525) is triggered by Trade 1;
Trade 2 TON 2 (5-lot) trades with TON 7 (5-lot) at 864.50;
TON 8-Stop (86450) is triggered by Trade 2;
Trade 3 TON 3 (5-lot) trades with TON 8 (5-lot) at 864.00;
TON 9-Stop (86400) is triggered by Trade 3;
Trade 4 TON 4 (5-lot) trades with TON 9 (5-lot) at 863.00; and
TON 10-Stop (86300) is triggered by Trade 4.

The market is placed in a reserved state because the trade that would occur at a price of 853.00 would violate the no bust range. The no bust range for ES is currently six. Since the stop iteration began with a trade price of 865.25, the market will not trade past a price of 859.25. The order book will display the following in a reserved state:

| | | ESM3 | | | |
|---|---|---|---|---|---|
| TON | QTY | BID | ASK | QTY | TON |
| TON 5 | 5 | 85300 | 85300 | 5 | TON 10 |

During the reserved state, the remaining bid is cancelled (TON 5) and a better offer enters the market. The indicative opening price is currently an 852.00A (better offer).

| | | ESM3 | | | |
|---|---|---|---|---|---|
| TON | QTY | BID | ASK | QTY | TON |
| | | | 85300 | 5 | TON 10 |
| | | | 85200 | 5 | TON 11 |

After waiting a predetermined length of time, the indicative opening price (852.00) is outside the no bust range of 853.25 (2×6.00) and the market will remain in reserved state for a second iteration. After the second iteration is exhausted, the indicative opening price will lie inside the no bust range and the market opens.

In the twelfth example, the market is reserved. Upon validation of an indicative opening price, (an indicative opening price that is a better bid (B)) the market opens because the indicative opening price no longer violates the no bust range.

| ESM3 | | | | | |
|---|---|---|---|---|---|
| TON | QTY | BID | ASK | QTY | TON |
| TON 11 | Stop (85400) | 5 | 85525 | 85400 | 1 | TON 1 |
| TON 10 | Stop (85525) | 5 | 85625 | 85525 | 5 | TON 2 |
| TON 9 | Stop (85625) | 5 | 85775 | 85625 | 5 | TON 3 |
| TON 8 | Stop (85775) | 5 | 85950 | 85775 | 5 | TON 4 |
| TON 7 | Stop (85950) | 5 | 86025 | 85950 | 5 | TON 5 |
| | | | | 86025 | 5 | TON 6 |
| Incoming1 | | 1 | 85400 | | | |

With the market in a continuous trading state, the following sequence occurs if Incoming1—Buy of 1 @ 854.00 enters the market:
  Trade 1 Incoming1 (1-lot) trades with TON 1 (1-lot) at 854.00;
  TON 11-Stop (85400) is triggered by Trade 1;
  Trade 2 TON 11 (5-lot) trades with TON 2 (5-lot) at 855.25;
  TON 10-Stop (85525) is triggered by Trade 2;
  Trade 3 TON 10 (5-lot) trades with TON 3 (5-lot) at 856.25;
  TON 9-Stop (85625) is triggered by Trade 3;
  Trade 4 TON 9 (5-lot) trades with TON 4 (5-lot) at 857.75;
  TON 8-Stop (85775) is triggered by Trade 4;
  Trade 5 TON 8 (5-lot) trades with TON 5 (5-lot) at 859.50; and
  TON 7-Stop (85950) is triggered by Trade 5.

The market is placed in a reserved state because the trade that would occur at a price of 860.25 would violate the no bust range. The no bust range for ES is currently six. Since the stop iteration began with a trade price of 854.00, the market will not trade past a price of 860.00. The order book will display the following in a reserved state:

| ESM3 | | | | | |
|---|---|---|---|---|---|
| TON | QTY | BID | ASK | QTY | TON |
| TON 7 | 5 | 86025 | 86025 | 5 | TON 6 |

During the reserved state, the remaining offer is cancelled (TON 6). After waiting a preset length of time, the indicative opening price will be the bid price (860.25) which is no longer in violation of the no bust range (866.00) and the market opens.

In a thirteenth example, the market is reserved. Upon a validation of the indicative opening price (an indicative opening price that is a better offer (A) that no longer violates the no bust range) the market opens.

| ESM3 | | | | | |
|---|---|---|---|---|---|
| TON | QTY | BID | ASK | QTY | TON |
| TON 1 | 1 | 86525 | 86450 | 5 | Stop (86525) TON 7 |
| TON 2 | 5 | 86450 | 86400 | 5 | Stop (86450) TON 8 |
| TON 3 | 5 | 86400 | 86300 | 5 | Stop (86400) TON 9 |
| TON 4 | 5 | 86300 | 85900 | 5 | Stop (86300) TON 10 |
| TON 5 | 5 | 85900 | | | |
| | | | 86525 | 1 | Incoming1 |

With the market in a continuous trading state, the following sequence occurs if Incoming1—Sell of 1 @ 865.25 enters the market:
  Trade 1 Incoming1 (1-lot) trades with TON 1 (1-lot) at 865.25;
  TON 7-Stop (86525) is triggered by Trade 1;
  Trade 2 TON 2 (5-lot) trades with TON 7 (5-lot) at 864.50;
  TON 8-Stop (86450) is triggered by Trade 2;
  Trade 3 TON 3 (5-lot) trades with TON 8 (5-lot) at 864.00;
  TON 9-Stop (86400) is triggered by Trade 3;
  Trade 4 TON 4 (5-lot) trades with TON 9 (5-lot) at 863.00; and
  TON 10-Stop (86300) is triggered by Trade 4.

The market is placed in a reserved state because the trade that would occur at a price of 859.00 would violate the no bust range. The no bust range for ES is currently six. Since the stop iteration began with a trade price of 865.25, the market will not trade past a price of 859.25. The order book will display the following in a reserved state:

| ESM3 | | | | | |
|---|---|---|---|---|---|
| TON | QTY | BID | ASK | QTY | TON |
| TON 5 | 5 | 85900 | 85900 | 5 | TON 10 |

During the reserved state, the remaining bid is cancelled (TON 5). After waiting a preset length of time, the indicative opening price is the offer price (859.00) which is no longer in violation of the no bust range (853.25) and the market opens.

When a buy order enters the market for a quantity of 1 at 861.00, a cascade of stop orders is triggered in a fourteenth example.

| ESM3 | | | | | |
|---|---|---|---|---|---|
| TON | QTY | BID | ASK | QTY | TON |
| TON 6 | Stop (86100) | 5 | 86250 | 86100 | 1 | TON 1 |
| TON 7 | Stop (86250) | 5 | 86350 | 86250 | 5 | TON 2 |
| TON 8 | Stop (86350) | 5 | 86450 | 86350 | 5 | TON 3 |
| TON 9 | Stop (86450) | 5 | 86850 | 86450 | 5 | TON 4 |
| TON 10 | Stop (86450) | 5 | 86875 | 86800 | 5 | TON 5 |
| TON 11 | Stop (86450) | 10 | 86900 | | | |
| Incoming1 | TON 12 | 1 | 86100 | | | |

With the market in a continuous trading state, the following sequence occurs if Incoming1—Buy of 1 @ 861.00 enters the market:
  Trade 1 Incoming 1, TON 12 (1-lot) trades with TON 1 (1-lot) at 861.00;
  TON 6-Stop (86100) is triggered by Trade 1;
  Trade 2 TON 2 (5-lot) trades with TON 6 (5-lot) at 862.50;
  TON 7-Stop (86250) is triggered by Trade 2;
  Trade 3 TON 3 (5-lot) trades with TON 7 (5-lot) at 863.50;
  TON 8-Stop (86350) is triggered by Trade 3;
  Trade 4 TON 4 (5-lot) trades with TON 8 (5-lot) at 864.50; and
  TON 9-Stop (86450), TON 10-Stop (86450) and TON 11-Stop (86450) are triggered by Trade 4.

The market is placed into a reserved state because the trade that would occur at a price of 868.50 would violate the no bust range. The no bust range for ES is currently six. Since the stop iteration began with a trade price of 861.00, the market will not trade past a price of 867.00. The order book will display the following in a reserved state:

| | ESM3 | | | | |
|---|---|---|---|---|---|
| TON | QTY | BID | ASK | QTY | TON |
| Incoming2 | indicative opening price | 10 | 86875 | 86875 | 12 | TON 5 |
| TON 9 | | 5 | 86850 | | |
| TON 10 | | 5 | 86875 | | |
| TON 11 | | 5 | 86900 | | |

During the first iteration, a second incoming order is entered which generates a bias on the bid side of the market. The indicative opening price generated after the second incoming order enters a 10-lot on the bid side and a 12-lot on the offer side at a price of 868.75. After waiting a predetermined length of time, if the indicative opening price is greater than twice the no bust range (12.00 from the original last price), the market will remain in a reserved state for a second time iteration. In this example, the market opens at the end of a five second delay because the indicative opening price (868.75) is not outside the no bust range (873.00). The following trades then take place:
  Trade 7 TON 10 (5-lot) trades with TON 5 (5-lot) at 868.75;
  Trade 8 TON 11 (5-lot) trades with TON 5 (5-lot) at 868.75; and
  Trade 9 Incoming2 (2-lot) trades with TON 5 (2-lot) at 868.75.

| ESM3 | | | |
|---|---|---|---|
| QTY | BID | ASK | QTY |
| 8 | 86875 | | |
| 5 | 86850 | | |

When a sell order enters the market for a quantity of 1 at 861.00, a cascade of stop orders is triggered in a fifteenth example. The minimum price that can be traded in this trading iteration is 859.25.

| ESM3 | | | | | |
|---|---|---|---|---|---|
| TON | QTY | BID | ASK | QTY | TON |
| TON 1 | 1 | 865.25 | 864.50 | 5 | Stop (865.25) TON 6 |
| TON 2 | 5 | 864.50 | 864.00 | 5 | Stop (864.50) TON 7 |
| TON 3 | 5 | 864.00 | 863.00 | 5 | Stop (864.00) TON 8 |
| TON 4 | 5 | 863.00 | 859.00 | 5 | Stop (863.00) TON 9 |
| TON 5 | 12 | 859.00 | 858.50 | 5 | Stop (863.00) TON 10 |
| | | | 858.00 | 5 | Stop (863.00) TON 11 |
| | | | Incoming1 | 1 | 865.25 TON 12 |

With the market in a continuous trading state, the following sequence occurs if Incoming1—Buy of 1 @ 865.25 enters the market:
  Trade 1 Incoming1, TON 12 (1-lot) trades with TON 1 (1-lot) at 865.25;
  TON 6 (865.25) is triggered by Trade 1;
  Trade 2 TON 2 (5-lot) trades with TON 6 (5-lot) at 864.50; TON 7 (864.50) 864.00 is triggered by Trade 2;
  Trade 3 TON 3 (5-lot) trades with TON 7 (5-lot) at 864.00; TON 8 (864.00) is triggered by Trade 3;
  Trade 4 TON 4 (5-lot) trades with TON 8 (5-lot) at 863.00; and TON 9 (86300), TON 10 (86300) and TON 11 (86300) are triggered by Trade 4.

The market is placed into a reserved state because the trade that would occur at a price of 859.00 would violate the no bust range. The no bust range for ES is currently six. Since the stop iteration began with a trade price of 865.25, the market will not trade past a price of 859.25. The order book will display the following in a reserved state:

| | ESM3 | | | | |
|---|---|---|---|---|---|
| TON | QTY | BID | ASK | QTY | TON |
| TON 5 | 12 | 859.00 | 859.00 | 5 | TON 9 |
| | | | 858.75 | 10 | Incoming2 |
| | | | 858.50 | 5 | TON 10 |
| | | | 858.00 | 5 | TON 11 |

During the first iteration a second incoming order entered generates a bias on the sell side of the market. The indicative opening price generated after the second incoming order enters a 12-lot on the bid side and 10-lot on the offer side with an indicative opening price of 858.75. After waiting a predetermined length of time, if the indicative opening price is greater than twice the no bust range (12.00 from the original last price), the market will remain in a reserved state for a second time iteration. In this example, the market will open at the end of a five second delay because the indicative opening price (858.75) is not outside the no bust range (853.25).
  Trade 7 TON 10 (5-lot) trades with TON 5 (5-lot) at 858.75;
  Trade 8 TON 11 (5-lot) trades with TON 5 (5-lot) at 858.75; and
  Trade 9 Incoming2 (2-lot) trades with TON 5 (2-lot) at 858.75.

In a sixteenth example, a stop order cascade occurs in the ESM3 market and there is a related product ESU3 that is in an implied trading unit with the ESM3 product. In this example, the ESM3 market is allowed to re-open and trade outright non-implied orders, but does not enable implied order trading until the related product ESU3 is no longer being held in reserve. A price verification time is programmed to five seconds and the initial no-bust range is six.

| | ESM3 | | | | |
|---|---|---|---|---|---|
| TON | QTY | BID | ASK | QTY | TON |
| TON 6 | Stop (88075) | 5 | 88475 | 87375 | 10 | TON 1 |
| TON 7 | Stop (87875) | 5 | 88475 | 87475 | 5 | TON 2 |
| TON 8 | Stop (87825) | 5 | 88325 | 87675 | 5 | TON 3 |
| TON 9 | Stop (87675) | 5 | 88475 | 87900 | 1 | TON 4 |
| TON 10 | Stop (87525) | 5 | 88475 | 88075 | 1 | TON 5 |
| TON 11 | Stop (87375) | 10 | 87900 | | | |
| TON 12 | Stop (87375) | 10 | 87675 | | | |
| Incoming | | 1 | 87375 | | | |

With the market in a continuous trading state, the following sequence occurs when an Incoming—Buy of 1 @ 873.75 enters the ESM3 market:
  Trade 1 Incoming (1-lot) trades with TON 1 (1-lot) at 873.75;
  TON 12-Stop (87375), TON 11-Stop (87375) are triggered by Trade 1;
  Trade 2 TON 12 (9-lot) trades with TON 1 (9-lot) at 873.75;

Trade 3 TON 12 (1-lot) trades with TON 2 (1-lot) at 874.75;

Trade 4 TON 11 (4-lot) trades with TON 2 (4-lot) at 874.75;

Trade 5 TON 11 (5-lot) trades with TON 3 (5-lot) at 876.75;

TON 10-Stop (87525), TON 9-Stop (87675) are triggered by Trade 5;

Trade 6 TON 11 (1-lot) trades with TON 4 (1-lot) at 879.00; and

TON 8-Stop (87825) and TON 7-Stop (87875) are triggered by Trade 6.

The ESM3 market is placed in a reserved state because the trade that would occur at a price of 880.75 would violate the no bust range. The no bust range for ESM3 is currently six. Since the stop iteration began with a trade price of 873.75, the ESM3 market will not trade past a price of 879.75. The ESM3 order book will display the following in a reserved state:

| | | ESM3 | | | |
|---|---|---|---|---|---|
| TON # | | QTY | BID | ASK | QTY TON # |
| TON 6 | Stop (88075) | 5 | 88475 | 88075 | 1 TON 5 |
| TON 10 | | 5 | 88475 | | |
| TON 9 | | 5 | 88475 | | |
| TON 7 | | 5 | 88475 | | |
| TON 8 | | 5 | 88325 | | |

The related ESU3 product that is in the implied trading unit with ESM3 also has disabled implied order trading due to the reservation of the ESM3 market. The ESU3 market also experiences a stop loss cascade while the ESM3 market is in a reserved state, in this example. After waiting a predetermined length of time, if the indicative opening price of ESM3 is greater than twice the no bust range (12.00 from the original last price), the ESM3 market will remain in a reserved state for a second time iteration.

However, the ESM3 market will be allowed to open at or near the end of the five second delay because the indicative opening price of ESM3 is not greater than twice the no bust range, pending verification that related products in implied trading units are not being held in reserve. The related product ESU3 is being held in reserve in this example, so the ESM3 market opens, but only non-implied trading of outright orders is allowed and the implied order trading remains disabled. After the related ESU3 market reopens, the implied order market reopens for the implied trading unit including ESM3 and ESU3. In addition, the following trade will take place in the ESM3 market after reopening, using normal indicative opening price logic:

Trade 7 TON 10 (1-lot) trades with TON 5 (1-lot) at 880.75; and

TON 6-Stop (88075) is triggered by Trade 7.

| | ESM3 | | |
|---|---|---|---|
| QTY | BID | ASK | QTY |
| 19 | 88475 | | |
| 5 | 88325 | | |

In a seventeenth example, a price comparison to a multiple of the no-bust range occurs in the ESM3 market. There is a related product ESU3 that is in an implied trading unit with the ESM3 product. In this example, the ESU3 market does not reopen until after the ESM3 market is no longer in reserve. When a sell order enters the ESM3 market for a quantity of 1 at 865.75, a cascade of stop orders is triggered. The minimum price that may be traded for the first trading iteration is 859.75 (1x) and the minimum price that may be traded for the second iteration is 853.75 (2x). The ESM3 market will be reserved at 859.75 (one iteration) and 853.75 (two iterations).

| | | ESM3 | | | |
|---|---|---|---|---|---|
| TON | QTY | BID | ASK | QTY | TON |
| TON 1 | 10 | 86575 | 86550 | 10 | Stop (86575) TON 8 |
| TON 2 | 5 | 86550 | 86450 | 5 | Stop (86550) TON 9 |
| TON 3 | 5 | 86500 | 86200 | 5 | Stop (86500) TON 10 |
| TON 4 | 5 | 86450 | 86250 | 5 | Stop (86450) TON 11 |
| TON 5 | 1 | 86250 | 86150 | 5 | Stop (86250) TON 12 |
| TON 6 | 10 | 86200 | 85300 | 10 | Stop (86200) TON 13 |
| TON 7 | 5 | 85300 | | | |
| | | | 86575 | 1 | Incoming1 |

With the ESM3 market in a continuous trading state, the following sequence occurs if Incoming1—Sell of 1 @ 865.75 enters the ESM3 market:

Trade 1 Incoming1 (1-lot) trades with TON 1 (1-lot) at 865.75;

TON 8-Stop (86575) is triggered by Trade 1;

Trade 2 TON 1 (9-lot) trades with TON 8 (9-lot) at 865.75;

Trade 3 TON 2 (1-lot) trades with TON 8 (1-lot) at 865.50;

TON 9-Stop (86550) is triggered by Trade 3;

Trade 4 TON 2 (4-lot) trades with TON 9 (4-lot) at 865.50;

Trade 5 TON 3 (1-lot) trades with TON 9 (1-lot) at 865.00;

TON 10 Stop (86500) is triggered by Trade 5;

Trade 6 TON 3 (4-lot) trades with TON 10 (4-lot) at 865.00;

Trade 7 TON 4 (1-lot) trades with TON 10 (1-lot) at 864.50;

TON 11-Stop (86450) is triggered by Trade 7;

Trade 8 TON 4 (4-lot) trades with TON 11 (4-lot) at 864.50;

Trade 9 TON 5 (1-lot) trades with TON 11 (1-lot) at 862.50;

TON 12-Stop (86250) is triggered by Trade 9;

Trade 10 TON 6 (5-lot) trades with TON 12 (5-lot) at 862.00;

TON 13-Stop (86200) is triggered by Trade 10; and

Trade 11 TON 6 (5-lot) trades with TON 13 (5-lot) at 862.00.

The ESM3 market is placed in a reserved state because the trade that would occur at a price of 853.00 would violate the no bust range. The no bust range for ESM3 is currently six. Since the stop iteration began with a trade price of 865.75, the ESM3 market will not trade past a price of 859.75 (1x) and 853.75 (2x). The ESM3 order book will display the following in a reserved state:

| | | ESM3 | | | |
|---|---|---|---|---|---|
| TON | QTY | BID | ASK | QTY | TON |
| TON 7 | 5 | 85300 | 85300 | 5 | TON 13 |

The related ESU3 product that is in the same implied trading unit as ESM3 is also being held in reserve due to a stop loss cascade in the ESU3 market that occurred within the five second price verification time. After waiting a predetermined length of time, if the indicative opening price (853.00) is greater than twice the no bust range (12.00 from the original last price), the market will remain in a reserved state for a second time iteration.

The ESM3 market will repeat a second iteration in a reserve state because the indicative opening price is greater than twice the no bust range. In this example, the related product ESU3 is being held in reserve because the ESU3 market also had a stop loss cascade, but the ESU3 market reopens after a single iteration. However, the ESU3 market may only re-enable implied order matching if it is verified that related products in implied trading units are not being held in reserve. In this example, the ESM3 product, related to ESU3 in an implied trading unit, is still in reserve due to its second iteration in a reserve state. Therefore, the ESM3 market may reopen but only outright non-implied orders may be matched until the ESM3 market is no longer being held in reserve.

After the second iteration of the ESM3 market in a reserve state, the ESM3 market will again validate the indicative opening price. The ESM3 market will re-open because the indicative opening price (853.00) is within the new price range. Because the related ESU3 market is no longer being held in reserve, implied order trading may be ren-enabled for the trading unit. The following trade may then take place in the ESM3 market:

Trade 12 TON 7 (5-lot) trades with TON 13 (5-lot) at 853.00.

While some embodiments of the invention have been described, it should be apparent that many more embodiments and implementations are possible and are within the scope of this invention. It is intended that the foregoing detailed description be regarded as illustrative rather than limiting, and that it be understood that it is the following claims, including all equivalents, that are intended to define the spirit and scope of this invention.

We claim:

1. A computer readable medium storing instructions which when executed mitigate the effects of a market spike caused by the triggering of conditional orders for products within a trading unit, the computer readable medium comprising:
   an evaluation logic that monitors orders submitted to an automated trading engine in an automated matching system, the evaluation logic configured to compare an execution price of a conditional order to a predetermined price range;
   a delay logic that delays a matching of the orders submitted to the automated trading engine when the execution price lies outside of the predetermined price range;
   a pricing logic that derives an opening price to be used by the automated trading engine;
   a timing logic that measures a time interval used to further delay a matching of the orders until the opening price is within a second predetermined price range; and
   a verification logic that verifies that legs of an implied order are not in a reserved state, the verification logic configured to delay a matching of implied orders until all legs of the implied order are verified as not in the reserved state.

2. The system of claim 1 wherein the predetermined price range is based on a no-bust range.

3. The system of claim 1 wherein the predetermined price ranges comprise a varying price range and the time interval comprises a varying time interval, the varying price range and the varying time interval based on a time of day and a market volatility.

4. The system of claim 1 wherein the second predetermined price range comprises a multiple of a no-bust range.

5. The system of claim 1 wherein the opening price comprises an equilibrium price that falls substantially between the prices of the pending bids and the prices of the pending offers.

6. The system of claim 1 further comprising a matching system coupled to the evaluation logic, the matching system comprising one or more matching systems selected from the group comprising a first in, first out system, an allocation system, and a hybrid of a price and time priority.

7. The system of claim 1 wherein the time interval varies with a product.

8. The system of claim 1 wherein the legs of the implied order comprise orders for related products within the trading unit.

9. The system of claim 1 wherein the conditional order comprises a stop order.

10. The system of claim 1, wherein at least one of the implied orders is generated from an outright compound order.

11. The system of claim 1, wherein at least one of the implied orders is generated from a plurality of outright orders.

12. A method of mitigating the effect of a market spike caused by the triggering of conditional orders for products within a trading unit, comprising:
    monitoring, using an order processor, orders submitted to an automated trading engine in an automated matching system;
    comparing, using the order processor, an execution price of a conditional order to a predetermined price range;
    delaying a matching of orders submitted to the automated trading engine when the execution price of the conditional order lies outside of the predetermined price range;
    deriving an opening price to be used by the automated trading engine;
    delaying a matching of the orders until the opening price lies within a second predetermined price range or a time period lapses;
    verifying that legs of an implied order are not in a reserved state; and
delaying a matching of implied orders until all legs of the implied order are verified as not in the reserved state.

13. The method of claim 12 wherein the predetermined price range is based on a no-bust range and the second predetermined price range comprises a multiple of a no-bust range.

14. The method of claim 12 wherein the predetermined price range comprises a varying price range that changes with a time of day or a market volatility.

15. The method of claim 12 wherein the opening price comprises an equilibrium price that falls substantially between the prices of the pending bids and the prices of the pending offers.

16. The method of claim 12 wherein the opening price is derived to fall substantially within an overlap of pending bid and offer prices.

17. The method of claim 12 wherein the conditional order comprises a stop order.

18. The method of claim 12, wherein at least one of the implied orders is generated from an outright compound order.

19. The method of claim 12, wherein at least one of the implied orders is generated from a plurality of outright orders.

* * * * *